US 8,994,611 B2

(12) United States Patent
Sugihara et al.

(10) Patent No.: US 8,994,611 B2
(45) Date of Patent: Mar. 31, 2015

(54) HEAD-MOUNTED TYPE DISPLAY DEVICE

(75) Inventors: Ryohei Sugihara, Machida (JP); Seiji Tatsuta, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 949 days.

(21) Appl. No.: 13/069,772

(22) Filed: Mar. 23, 2011

(65) Prior Publication Data
US 2011/0234476 A1  Sep. 29, 2011

(30) Foreign Application Priority Data

Mar. 24, 2010  (JP) ................... 2010-068776
Mar. 24, 2010  (JP) ................... 2010-068782
Mar. 24, 2010  (JP) ................... 2010-068784
Mar. 24, 2010  (JP) ................... 2010-068787

(51) Int. Cl.
*G09G 5/00*     (2006.01)
*G02C 1/00*     (2006.01)
*G02B 27/01*    (2006.01)
*G02C 9/00*     (2006.01)
*F21V 8/00*     (2006.01)

(52) U.S. Cl.
CPC .............. *G02C 1/00* (2013.01); *G02B 27/0172* (2013.01); *G02B 27/0176* (2013.01); *G02C 9/00* (2013.01); *G02B 6/0018* (2013.01); *G02B 2027/0156* (2013.01); *G02B 2027/0178* (2013.01)
USPC ............................................ 345/8

(58) Field of Classification Search
None
See application file for complete search history.

(56) References Cited

U.S. PATENT DOCUMENTS

| | | | | |
|---|---|---|---|---|
| 5,229,598 A | * | 7/1993 | Filipovich | 250/214 VT |
| 5,479,224 A | * | 12/1995 | Yasugaki et al. | 353/101 |
| 5,757,544 A | * | 5/1998 | Tabata et al. | 359/434 |
| 6,172,657 B1 | * | 1/2001 | Kamakura et al. | 345/8 |
| 6,384,982 B1 | * | 5/2002 | Spitzer | 359/630 |
| 2005/0078378 A1 | * | 4/2005 | Geist | 359/630 |

(Continued)

FOREIGN PATENT DOCUMENTS

| | | |
|---|---|---|
| CN | 100416340 C | 9/2008 |
| CN | 101311772 A | 11/2008 |

(Continued)

OTHER PUBLICATIONS

European Search Report dated Nov. 24, 2011 in corresponding European Patent Application No. EP 11 00 2415.5.

(Continued)

*Primary Examiner* — Antonio Xavier
(74) *Attorney, Agent, or Firm* — Scully, Scott, Murphy & Presser, P.C.

(57) ABSTRACT

A head-mounted type display device includes: a spectacle frame for fixture to a user's head; a body unit 2 fixed to the spectacle frame and having an image output unit from which image output unit image light of an image to be displayed is output; an eyepiece optical unit 3 for allowing image light output from the image output unit to be incident on the eyepiece optical unit, for guiding the incident image light to the corresponding eyeball 11 of the user with the spectacle frame being mounted on the user's head, and for displaying, as a virtual image, a magnified version of the image from the image output unit within a user's visual field; and an attachment means 4 for attaching the eyepiece optical unit 3 to the body unit in a replaceable manner. The attachment means 4 may attach at least first and second eyepiece optical units to each other in a replaceable manner, the first and second eyepiece optical units having different optical axis paths L in optical systems for guiding the image light from the image output unit to the eyeball 11.

6 Claims, 25 Drawing Sheets

(56) References Cited

U.S. PATENT DOCUMENTS

| | | | |
|---|---|---|---|
| 2005/0234348 A1* | 10/2005 | Watanabe et al. | 600/476 |
| 2007/0058261 A1* | 3/2007 | Sugihara et al. | 359/630 |
| 2007/0236800 A1* | 10/2007 | Cakmakci et al. | 359/630 |
| 2007/0267567 A1* | 11/2007 | Filipovich et al. | 250/214 VT |
| 2009/0097127 A1* | 4/2009 | Amitai | 359/633 |
| 2009/0147331 A1* | 6/2009 | Ashkenazi | 359/13 |
| 2010/0073262 A1* | 3/2010 | Matsumoto | 345/8 |
| 2010/0171680 A1* | 7/2010 | Lapidot et al. | 345/8 |
| 2010/0245754 A1* | 9/2010 | Matsumoto et al. | 351/158 |
| 2011/0012814 A1* | 1/2011 | Tanaka | 345/8 |
| 2012/0068914 A1* | 3/2012 | Jacobsen et al. | 345/8 |

FOREIGN PATENT DOCUMENTS

| | | |
|---|---|---|
| CN | 100520490 C | 7/2009 |
| EP | 0 389 403 A2 | 9/1990 |
| EP | 1 757 974 A1 | 2/2007 |
| JP | A-H08-032897 | 2/1996 |
| JP | B-2957071 | 7/1999 |
| JP | A-2006-003879 | 1/2006 |

OTHER PUBLICATIONS

Abstract of Japanese Patent Publication No. 07-168118 dated Jul. 4, 1995.

Chinese Office Action dated May 27, 2014 from Chinese Patent Application No. 201110072230.5.

Chinese Office Action dated Dec. 17, 2014 received in Chinese Application No. 201110072230.5, together with an English language translation.

* cited by examiner

FIG. 2
(a)
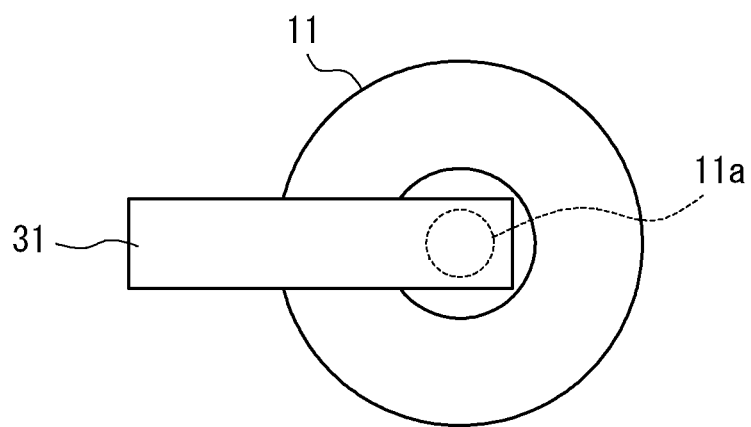
(b)
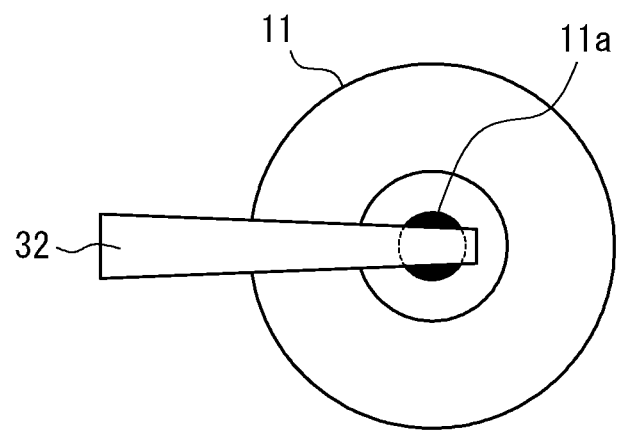

FIG. 3
(a)
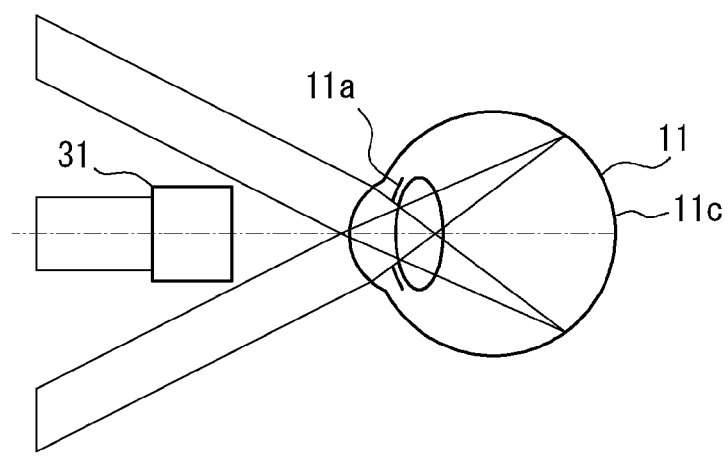
(b)
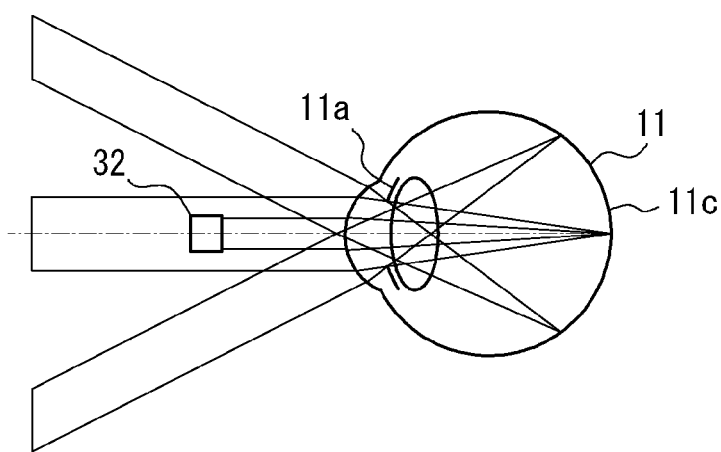

FIG. 4
(a)
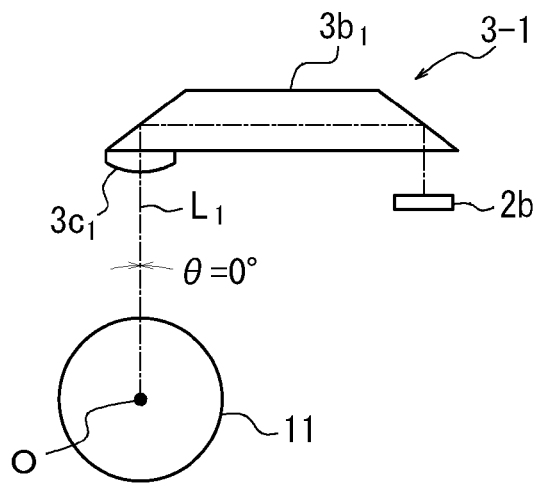
(b)
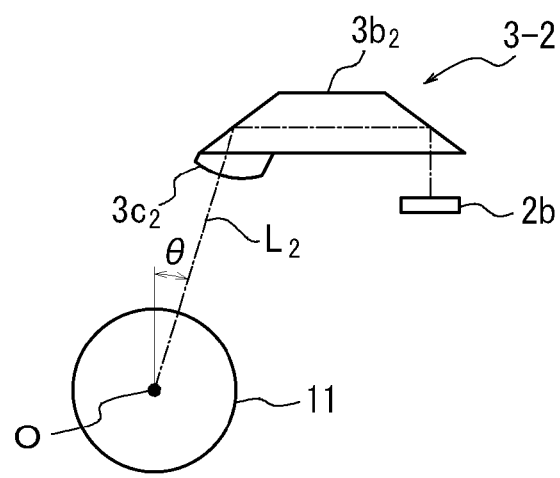

FIG. 8
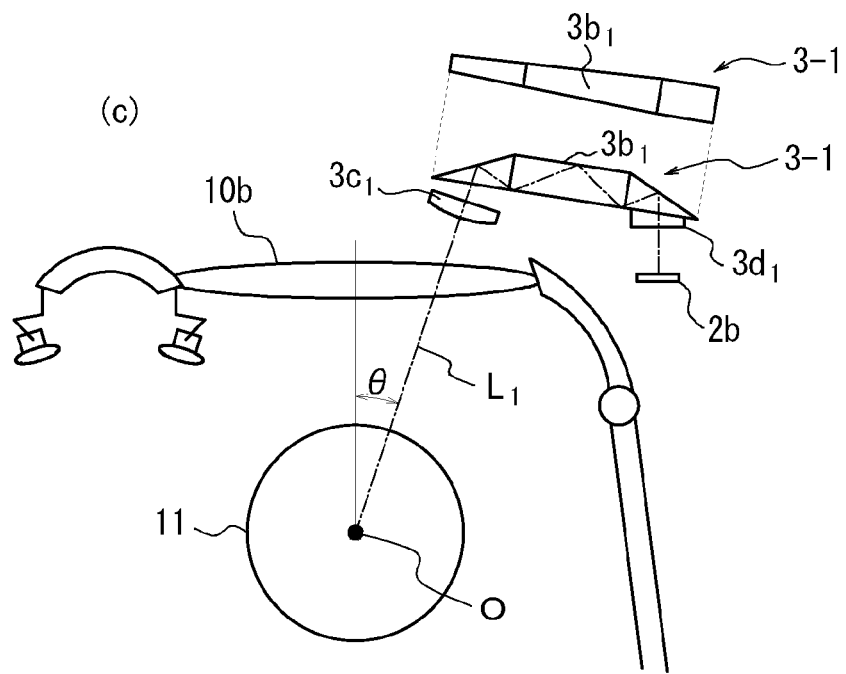
(c)
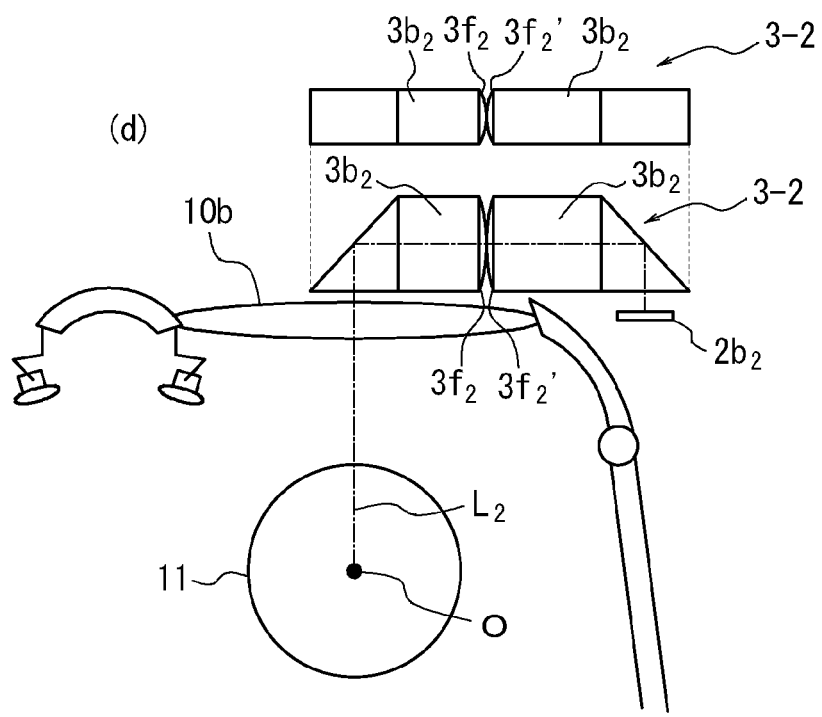
(d)

FIG. 9

(a) For Mobile

Direction of Visual Field : 20 degrees to the right
Angle of Display Plane : 9 degrees horizontal
Reflection Times : 5
Optical System Width : 2.6mm at tip
Shape : tapered
Focal Length : 30mm
Diopter : 2D(0.5m)

(b) For Image Viewing

Direction of Visual Field : 0 degree (front)
Angle of Display Plane : 14 degrees horizontal
Reflection Times : 2
Optical System Width : 8mm at tip
Shape : constant width
Focal Length : 19mm
Diopter : 1D(1m)

FIG. 11
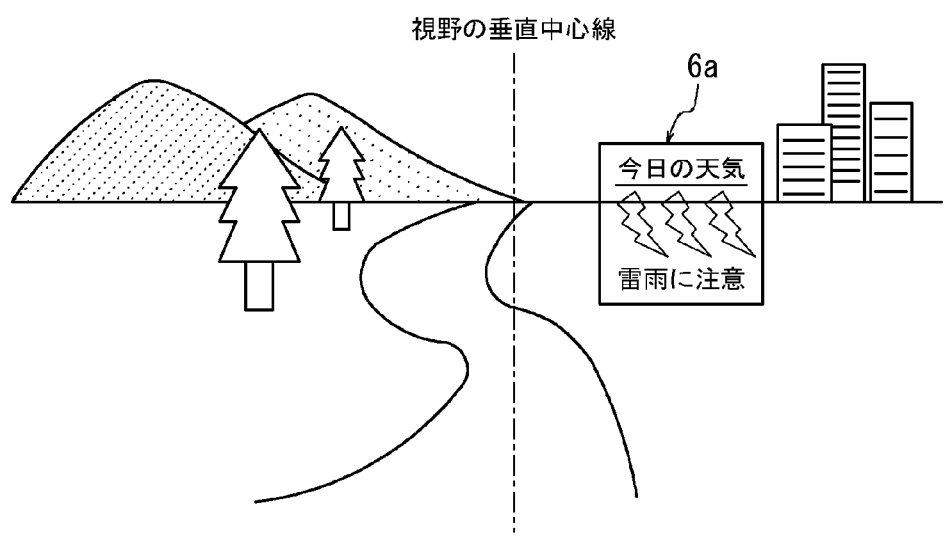
(a)
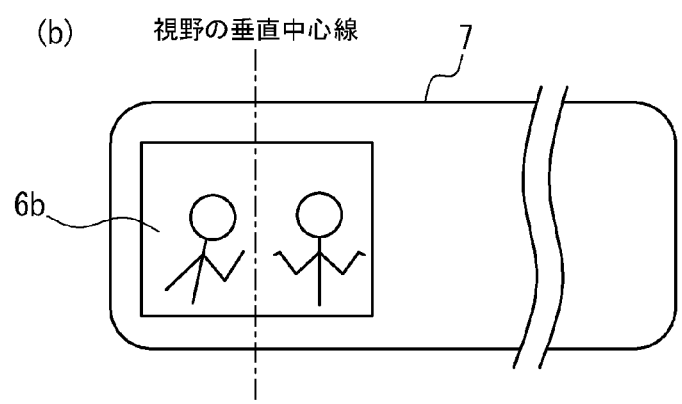
(b)

FIG. 14
(a)
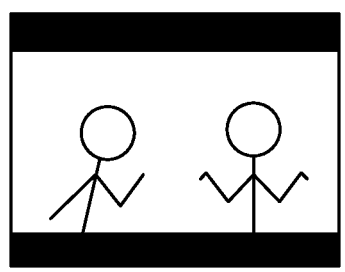
(b)
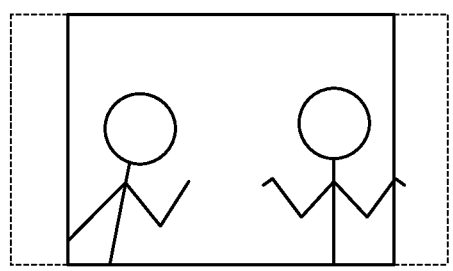

FIG. 15
(a)
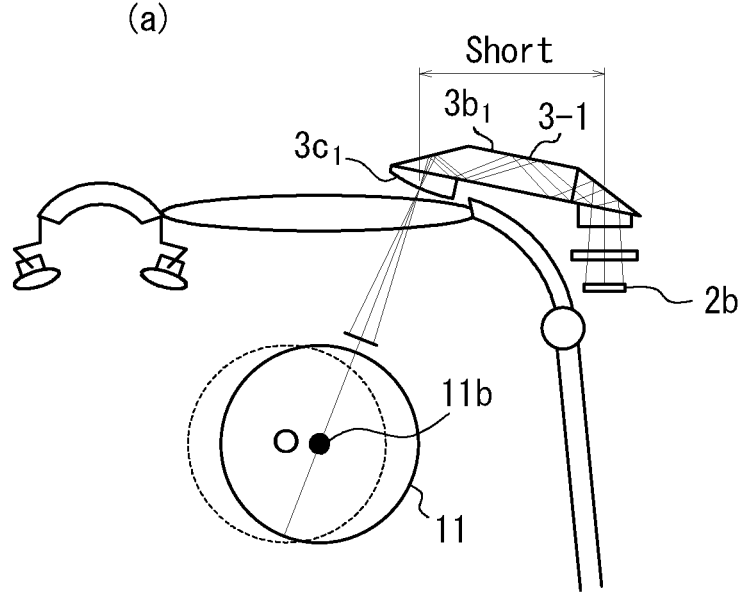
(b)
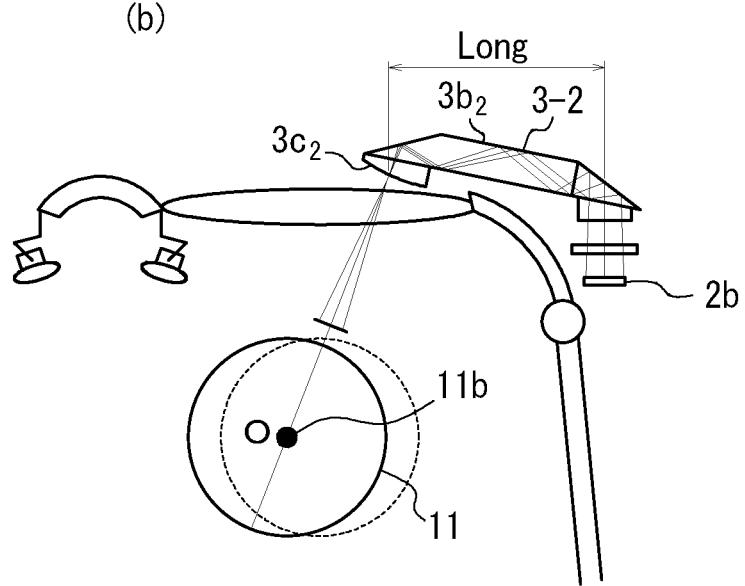

FIG. 20
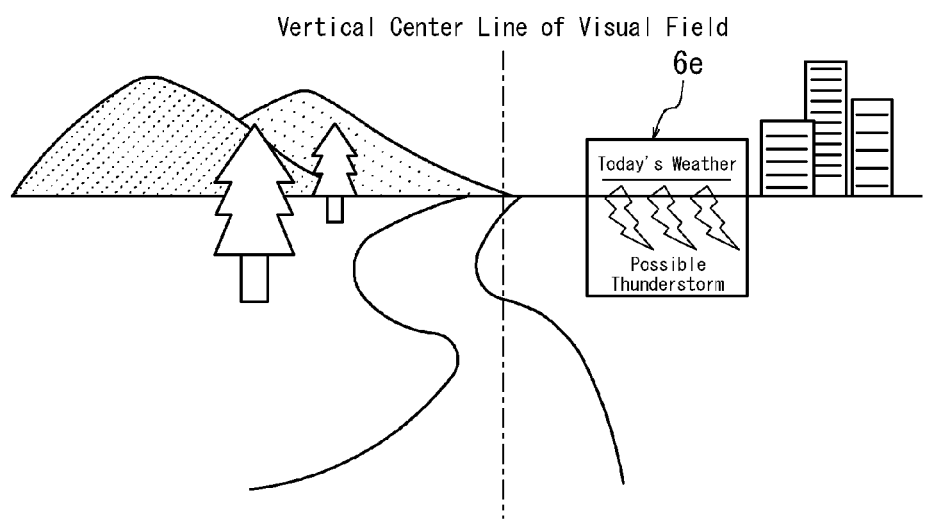
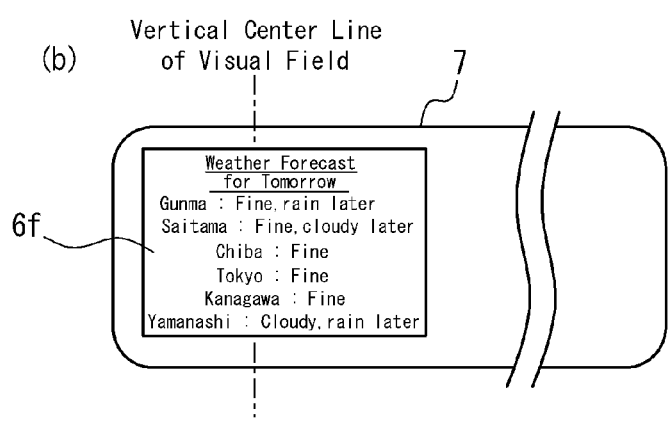

FIG. 21

(a) Example of Horizontal Display Screen

| Weather Forecast for Tomorrow |
|---|
| Gunma : Rain |
| Saitama : Cloudy |
| Chiba : Fine |
| Tokyo : Fine |
| Kanagawa : Fine |

(b) Example of Vertical Display Screen

| Weather Forecast for Tomorrow |
|---|
| Gunma : Rain |
| Saitama : Cloudy |
| Chiba : Fine |
| Tokyo : Fine |
| Kanagawa : Fine |
| Yamanashi : Rain |
| Ibaraki : Fine |

HEAD-MOUNTED TYPE DISPLAY DEVICE

CROSS-REFERENCE TO RELATED APPLICATION

This application claims priority to Japanese Patent Application Nos. 2010-68784, 2010-68787, 2010-68776 and 2010-68782, filed on Mar. 24, 2010, the contents of which are incorporated herein by reference in their entireties.

TECHNICAL FIELD

The present invention generally relates to head-mounted type display devices.

BACKGROUND OF THE INVENTION

Conventionally, head-mounted type display devices have different optimum optical specifications for different applications, such as for image viewing or mobile applications, and thus require separate devices to be prepared for the applications. For example, for image viewing applications, such specifications are preferable where a large-screen image can be displayed in front of a viewer within his/her visual field; for mobile applications, it is preferable to, for example, display an image at an end within the visual field while ensuring the outside visual field.

However, it is costly to prepare, and inconvenient to carry around different head-mounted type display devices depending on the number of usage required. Among others, and as will be more and more important in the future, in view of increasing availability of such devices for daily use and mobile applications, these devices can be used by the users in more diverse ways. There is a need for devices that can accommodate such diverse applications.

Therefore, in order to deal with different applications, one technology has been proposed to change viewing angles according to the application by providing a plurality of eyepiece optical systems in packages and selectively positioning the eyepiece optical systems in packages, as appropriate, in a head-mounted housing positioned in front of a user's eye (see, for example, Patent Document 1).

Another technology has also been proposed that allows switching between states by providing a liquid crystal shutter inside the optical path of the outside light: one in which only image light from an image display element is directed to an eyeball of the viewer and displayed as a non-see-through image, and the other in which outside light coming from ahead of the user is superposed on image light and the resulting image is displayed as a see-through image (see, for example, Patent Document 2).

Moreover, other technologies have been proposed that achieves see-through display using a light guide unit thinner than the pupil diameter (see, for example, Patent Document 3).

CONVENTIONAL ART REFERENCES

Patent Documents

Patent Document 1: Japanese Patent No. 2957071
Patent Document 2: Japanese Patent Laid-Open No. (HEI) 8-32897
Patent Document 3: Japanese Patent Laid-Open No. 2006-3879

SUMMARY OF THE INVENTION

According to a first aspect, the invention of a head-mounted type display device comprises:

a support portion for fixture to a user's head;
a body unit fixed to the support portion and having an image output unit from which image output unit image light of an image to be displayed is output;
an eyepiece optical unit for allowing image light output from the image output unit to be incident on the eyepiece optical unit, for guiding the incident image light to the corresponding eyeball of the user with the support portion being fixed to the user's head, and for displaying, as a virtual image, a magnified version of the image from the image output unit within a user's visual field; and
an attachment portion for attaching the eyepiece optical unit to the body unit in a replaceable manner,
wherein the attachment portion attaches at least first and second eyepiece optical units in a replaceable manner, the first and second eyepiece optical units having different optical axis paths in optical systems for guiding the image light from the image output unit to the eyeball.

The invention according to a second aspect provides the head-mounted type display device according to the first aspect, wherein the first eyepiece optical unit and the second eyepiece optical unit differ in number of times the optical axis path is bent.

The invention according to a third aspect provides the head-mounted type display device according to the first aspect, wherein
the first eyepiece optical unit and the second eyepiece optical unit differ in exit position of the optical axis path from the eyepiece optical unit toward the eyeball.

The invention according to a fourth aspect provides the head-mounted type display device according to the first aspect, wherein
the first eyepiece optical unit and the second eyepiece optical unit differ in exit angle of the optical axis path from the eyepiece optical unit with respect to the eyeball.

The invention according to a fifth aspect provides the head-mounted type display device according to the first aspect, wherein
the first eyepiece optical unit and the second eyepiece optical unit differ in at least one of: length of the optical axis path; and optical path length.

The invention according to a sixth aspect provides the head-mounted type display device according to the first aspect, wherein
one of the first eyepiece optical unit and the second eyepiece optical unit has the optical axis path on the same plane, while the other has the optical axis path across a plurality of planes.

The invention according to a seventh aspect provides the head-mounted type display device according to the first aspect, wherein
the image output unit is located outside a visual axis of the eyeball, and each of the eyepiece optical units bends the optical axis path more than once.

The invention according to an eighth aspect provides the head-mounted type display device according to the first aspect, wherein
each of the eyepiece optical units is adapted to allow the optical axis path to pass through the center of the eyeball.

The invention according to a ninth aspect provides the head-mounted type display device according to the first aspect, wherein
the attachment portion is adapted to make it possible to replace the eyepiece optical units with each other while maintaining a fixed position relationship between the image output unit and the eyeball.

The invention according to a tenth aspect provides the head-mounted type display device according to the first aspect, wherein the body unit comprises an image switch unit for switching between display images depending on whether the attached eyepiece optical unit is the first or second eyepiece optical unit.

The invention according to an 11th aspect provides the head-mounted type display device according to the first aspect, wherein the attachment portion is arranged at a position without interference with a central visual field in frontal view.

The invention according to a 12th aspect provides the head-mounted type display device according to the 11th aspect, wherein the support portion is a spectacle frame, the body unit is fixed to or removably mounted on the spectacle frame, and the attachment portion is arranged at a position without interference with a visual field viewable by the user through a spectacle lens.

The head-mounted type display device according to a 13th aspect provides the head-mounted type display device according to the 11th aspect, wherein the attachment portion holds the eyepiece optical unit at a part near the incident side.

The head-mounted type display device according to a 14th aspect provides the head-mounted type display device according to the 11th aspect, wherein the first eyepiece optical unit and the second eyepiece optical unit are adapted to have different positions at which a virtual image is displayed within a visual field of the eyeball of the user.

The head-mounted type display device according to a 15th aspect provides the head-mounted type display device according to the 11th aspect, wherein the first eyepiece optical unit is adapted to display a virtual image at a position including a vertical center line of a visual field of the eyeball of the user, while the second eyepiece optical unit is adapted to display a virtual image at a position not including a vertical center line of the user's visual field.

The head-mounted type display device according to a 16th aspect provides the head-mounted type display device according to the 11th aspect, wherein the first eyepiece optical unit and the second eyepiece optical unit differ in one or both of shape and size.

The head-mounted type display device according to a 17th aspect provides the head-mounted type display device according to the 11th aspect, wherein the first eyepiece optical unit and the second eyepiece optical unit differ in viewing angle at which the image output unit is seen from the eyeball.

The head-mounted type display device according to an 18th aspect provides the head-mounted type display device according to the 11th aspect, wherein at least one of the first eyepiece optical unit and the second eyepiece optical unit is adapted to rotate image light incident from the image output unit by a predetermined angle.

The head-mounted type display device according to a 19th aspect provides the head-mounted type display device according to the 11th aspect, wherein at least one of the first eyepiece optical unit and the second eyepiece optical unit has different magnification ratios for the virtual image in a perpendicular direction and in a lateral direction.

The head-mounted type display device according to a 20th aspect provides the head-mounted type display device according to the 19th aspect, wherein the first eyepiece optical unit and the second eyepiece optical unit comprise respective eyepiece lenses having different focal lengths.

The head-mounted type display device according to a 21st aspect provides the head-mounted type display device according to the 11th aspect, wherein the first eyepiece optical unit and the second eyepiece optical unit comprise respective eyepiece lenses having different relative position relationships with the image output unit.

The head-mounted type display device according to a 22nd aspect provides the head-mounted type display device according to the 11th aspect, wherein one of the first eyepiece optical unit and the second eyepiece optical unit is adapted to display a virtual image within the user's visual field as a see-through image, while the other is configured to display a virtual image within the user's visual field as a non-see-through image.

The head-mounted type display device according to a 23rd aspect provides the head-mounted type display device according to the first aspect, wherein one of the first eyepiece optical unit and the second eyepiece optical unit comprises a tip portion having a width of projection section in a user's visual axis direction narrower than a pupil diameter, while the other of the first eyepiece optical unit and the second eyepiece optical unit comprises a tip portion having a width of projection section in a user's visual axis direction wider than the pupil diameter.

In this way, when the eyepiece optical unit is used that comprises the tip portion having a width of projection section in a user's visual axis direction wider than the pupil diameter, images are displayed in a non-see-through manner; whereas when the other is used that comprises the tip portion having a width of projection section in a user's visual axis direction narrower than the pupil diameter, images are displayed in a see-through manner. The possibility of replacing the first and second eyepiece optical units with each other may facilitate switching between non-see-through display and see-through display without electrical switch control means. This allows the device to be configured at a low cost. In addition, there is no need to provide a separate member over the eye, and thus the device may be provided as a small device, allowing usage in mobile environments or always-on applications.

The head-mounted type display device according to a 24th aspect provides the head-mounted type display device according to the 23rd aspect, wherein if an average diameter of the human pupil is 4 mm, then the one eyepiece optical unit comprises a tip portion having a width of projection section in a user's visual axis direction smaller than 4 mm, whereas the other eyepiece optical unit comprises a tip portion having a width of projection section in a user's visual axis direction greater than 4 mm.

The head-mounted type display device according to a 25th aspect provides the head-mounted type display device according to the 23rd aspect, wherein the one eyepiece optical unit has a length in the longitudinal direction shorter than the length of the other eyepiece optical unit in the longitudinal direction.

The head-mounted type display device according to a 26th aspect provides the head-mounted type display device according to the 23rd aspect, wherein the body unit comprises an image switch unit for switching between a see-through display mode in which a large range of change in luminance is set corresponding to the one eyepiece optical unit and a non-see-through display mode in which a small range of change in luminance is set corresponding to the other eyepiece optical unit.

The head-mounted type display device according to a 27th aspect provides the head-mounted type display device according to the first aspect, wherein the image output unit of the body unit comprises a display element for displaying the image to be displayed, and the body unit comprises an identification unit for identifying a type of the eyepiece optical unit attached with the attachment portion, and a control unit for controlling the image to the display element depending on the type of the eyepiece optical unit identified by the identification unit.

The head-mounted type display device according to a 28th aspect provides the head-mounted type display device according to the first aspect, further comprising:

an image signal output unit for outputting an image signal of the image to be displayed to the body unit, wherein the image output unit of the body unit comprises a display element for displaying the image to be displayed, the body unit comprises an identification unit for identifying and outputting a type of the eyepiece optical unit attached with the attachment portion to the image signal output unit, and the image signal output unit comprises a control unit for controlling the image to the display element depending on the type of the eyepiece optical unit.

The head-mounted type display device according to a 29th aspect provides the head-mounted type display device according to the first aspect, wherein the image output unit of the body unit comprises a display element for displaying the image to be displayed, and the body unit comprises an identification unit for identifying a type of the eyepiece optical unit attached with the attachment portion, a switch control unit for generating a control signal to switch between display forms of the image depending on the type of the eyepiece optical unit identified by the identification unit, and a communication unit for transmitting the control signal to a server and for receiving from the server an image signal of the image for which the display form is switched from one to another based on the control signal.

The head-mounted type display device according to a 30th aspect provides the head-mounted type display device according to the first aspect, wherein the image output unit of the body unit comprises a display element for displaying the image to be displayed, and the body unit comprises an identification unit for identifying a type of the eyepiece optical unit attached with the attachment portion, and a communication unit for transmitting information about the type of the eyepiece optical unit identified by the identification unit to a server and for receiving from the server an image signal of the image for which the display form is converted from one to another based on the type.

The head-mounted type display device according to a 31st aspect provides the head-mounted type display device according to any of the 27th to 30th aspects, wherein the eyepiece optical unit comprises identification information for identifying the type readable by the identification unit.

The head-mounted type display device according to a 32nd aspect provides the head-mounted type display device according to any of the 27th to 30th aspects, wherein the display element displays an image with different display character sizes depending on the type of the eyepiece optical unit identified by the identification unit.

The head-mounted type display device according to a 33rd aspect provides the head-mounted type display device according to any of the 27th to 30th aspects, wherein the display element displays an image that is reversed upside down and/or left to right depending on the type of the eyepiece optical unit identified by the identification unit.

The head-mounted type display device according to a 34th aspect provides the head-mounted type display device according to any of the 27th to 30th aspects, wherein the display element displays an image for which display luminance of image is switched from one to another depending on the type of the eyepiece optical unit identified by the identification unit.

The head-mounted type display device according to a 35th aspect provides the head-mounted type display device according to any of the 27th to 30th aspects, wherein the plurality of types of eyepiece optical units include an eyepiece optical unit for changing aspect ratio of image, and when one of the eyepiece optical units whose type is identified by the identification unit is the eyepiece optical unit for changing aspect ratio of image, an image to be displayed on the display element is compressed or expanded at different ratios in a perpendicular direction and in a lateral direction.

BRIEF DESCRIPTION OF THE DRAWINGS

FIG. 2 is a diagram for explaining a relationship between positions and dimensions of eyepiece optical units for non-see-through and see-through display and an eyeball with the head-mounted type display device being worn by a user;

FIG. 3 is a diagram for explaining the optical paths of outside light travelling toward the eyeball when the respective eyepiece optical units of FIG. 2 are used;

FIG. 4 is a diagrammatic representation for illustrating the configurations and optical systems of first and second eyepiece optical units for use in the head-mounted type display device as illustrated in FIG. 1;

FIG. 9 illustrates the respective specifications of the eyepiece optical units as illustrated in FIG. 8;

FIG. 11 is a conceptual diagram illustrating an image displayed by the head-mounted type display device with the eyepiece optical units as illustrated in FIG. 8;

FIG. 14 is a diagram for explaining images displayed on a display panel for displaying images having different aspect ratios without using the eyepiece optical unit of FIG. 13;

FIG. 15 is a diagram for explaining selection of eyepiece optical units depending on the width between the user's eyes when a head-mounted type display device according to a fifth embodiment of the present invention is used;

FIG. 20 is a conceptual diagram illustrating an image displayed by the head-mounted type display device as illustrated in FIG. 17;

FIG. 21 illustrates display examples of a horizontally long image and a vertically long image;

DETAILED DESCRIPTION OF THE EMBODIMENTS

Embodiments of the present invention will now be described below with reference to the accompanying drawings.

First Embodiment

Figure 1:
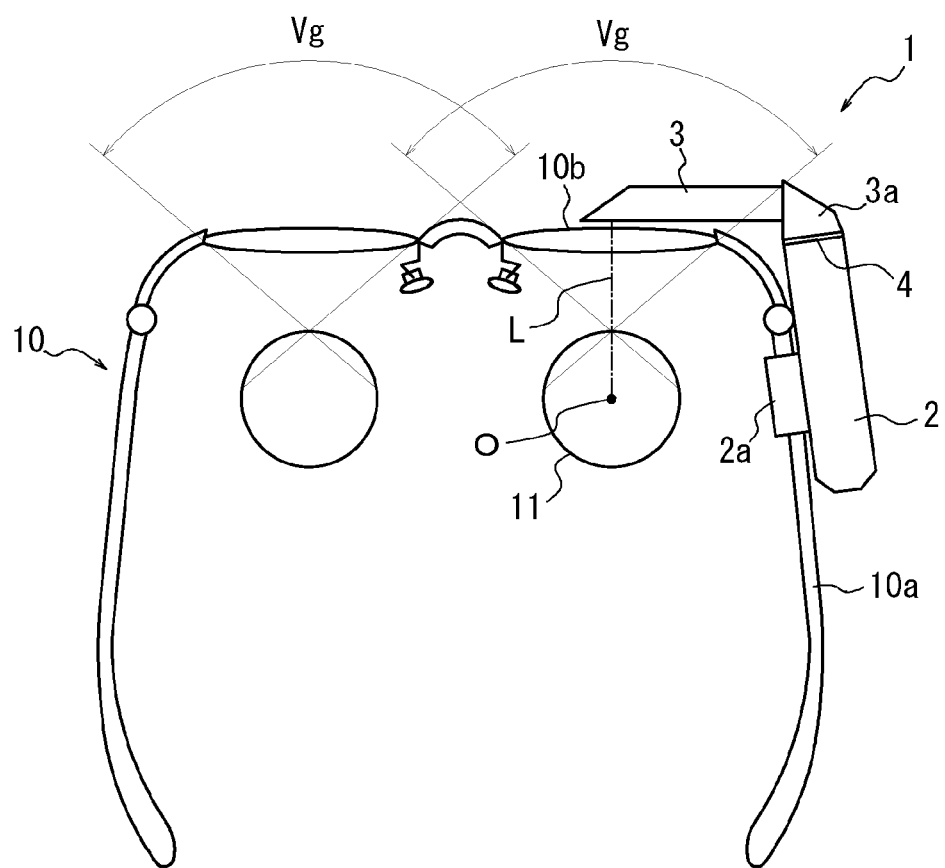
FIG. 1 illustrates a head-mounted type display device mounted on spectacles according to a first embodiment of the present invention.

FIG. 1 illustrates a head-mounted type display device mounted on spectacles according to a first embodiment of the present invention.

The head-mounted type display device 1 mainly comprises a body unit 2 and an eyepiece optical unit 3. The body unit 2 is fixedly supported on a spectacle frame 10a of spectacles 10 mounted on a user's head at the right temple portion via a spectacle fixture unit 2a. Accordingly, the support portion is adapted to include the spectacle fixture unit 2a.

The body unit 2 extends along the spectacle frame 10a and forward from the user's point of view. The body unit 2 has a tip that is mounted, lateral to the right spectacle lens, on a mirror frame 3a of the eyepiece optical unit 3 via an attachment portion 4, which will be described below. The eyepiece optical unit 3 extends substantially horizontally from the attachment portion 4 located outside the visual field through the spectacles (Vg) into a user's visual field, in front of the right spectacle lens 10b of the spectacles 10. The attachment portion 4 is relatively thick as compared with the tip portion of the eyepiece optical unit 3. The attachment portion 4 is positioned at a position without interference with the visual field that can be seen by the user through a spectacle lens (including a central visual field (a range of visual field of 30 degrees about a line of sight)).

Description will be made on how a non-see-through or see-through image is displayed depending on the width of projection section of the eyepiece optical unit in the visual axis direction. FIG. 2 is a diagram illustrating a relationship between positions and dimensions of eyepiece optical units for non-see-through and see-through display and an eyeball with the head-mounted type display device being worn by a user. For simplicity, FIG. 2 illustrates a non-see-through eyepiece optical unit 31 and a see-through eyepiece optical unit 32 having their tip portions located at the same position with respect to an eyeball. The non-see-through display eyepiece optical unit 31 illustrated in FIG. 2(a) comprises the tip portion having a width of projection section in a user's visual axis direction (a width in the vertical direction of the figure) larger than the diameter of a human pupil 11a. On the other hand, the see-through display eyepiece optical unit 32 illustrated in FIG. 2(b) comprises the tip portion having a width of projection section in a user's visual axis direction smaller than the diameter of the human pupil 11a.

FIG. 3 is a diagram for explaining the optical paths of outside light travelling toward the eyeball when the respective eyepiece optical units of FIG. 2 are used. When the non-see-through display eyepiece optical unit 31 is used, as illustrated in FIG. 3(a), outside light coming from ahead of the eyepiece optical unit cannot enter an eyeball 11 since the eyepiece optical unit 32 has a width larger than the pupil 11a. Thus, a non-see-through image is displayed without superposition of the background on the display image exiting from an exit window of the eyepiece optical unit 31. Alternatively, when the see-through display eyepiece optical unit 32 is used, as illustrated in FIG. 3(b), a part of the outside light coming from the forward direction that passes above and below the eyepiece optical unit 31 may pass through the pupil 11a to the retina 11c. Accordingly, a see-through image is displayed within the user's visual field with the background in front of the eyepiece optical unit 31 being superposed on the display image exiting from the exit window of the eyepiece optical unit 31.

Since the average diameter of the human pupil is around 4 mm, it is preferred that the non-see-through eyepiece optical unit 31 comprises a tip portion having a width of projection section in a user's visual axis direction greater than 4 mm, while the second see-through eyepiece optical unit 32 comprises a tip portion having a width of projection section in a user's visual axis direction 4 mm or less.

In this embodiment, a selected one of the first and second eyepiece optical units is attached as an eyepiece optical unit. The eyepiece optical units may be replaced to switch the optical axis path between an image output unit and the eyeball from one to another. FIG. 4 is a diagrammatic representation for illustrating the configurations of first and second eyepiece optical units for use in the head-mounted type display device as illustrated in FIG. 1: FIG. 4(a) corresponds to a first eyepiece optical unit 3-1; and FIG. 4(b) to a second eyepiece optical unit 3-2.

In addition, as illustrated in FIGS. 4(a) and 4(b), the body unit 2 comprises a display panel 2b as an image output unit at a position displaced from the visual axis of the user. The image light output from this display panel 2b is incident on rod-shaped light guide units $3b_1$, $3b_2$ from a side surface of each unit at one end. Each rod-shaped light guide unit has a rectangular cross section as well as inclined planes as reflecting surfaces at either end of the eyepiece optical units 3-1, 3-2 in the longitudinal direction. Then, the image light is reflected from one of the inclined planes, directed through these light guide units $3b_1$, $3b_2$ in the longitudinal direction, and is further reflected from the other inclined plane. Subsequently, it exits from eyepiece lenses $3c_1$, $3c_2$ toward the right eyeball 11 of the user. This image light is observed within the user's visual field as a virtual image, which is a magnified version of the image displayed on the display panel 2b. That is, in this embodiment, the display panel 2b is located outside the visual axis of the user, and the image light output from the display panel 2b is directed into the eyeball 11 of the user by the light guide units $3b_1$, $3b_2$.

In FIG. 4, the first eyepiece optical unit 3-1 is an eyepiece optical unit for displaying images in the frontal direction of the visual field. The light guide unit $3b_1$ of the first eyepiece optical unit 3-1 includes a tip that has a width of 4 mm or more and extends to the front of the eyeball 11. FIG. 1 illustrates the eyepiece optical unit 3 with the first eyepiece optical unit 3-1 being mounted to the body unit 2. On the other hand, the second eyepiece optical unit 3-2 is an eyepiece optical unit for displaying images at an end within the visual field. The light guide unit $3b2$ of the second eyepiece optical unit 3-2 includes a tip that has a width of 4 mm or less in the vertical direction and extends ahead to the right as viewed from the eyeball 11. Thus, the second eyepiece optical unit 3-2 is shorter than the first eyepiece optical unit.

The optical systems of FIG. 4 will now be described in terms of the optical axis path. Optical axis paths $L_1$ and $L_2$ each run from the display panel 2b located outside the visual axis of the user through the eyepiece optical units 3-1, 3-2 to the eyeball center O of the eyeball 11. The optical axis paths $L_1$ and $L_2$ with the first eyepiece optical unit 3-1 and the second eyepiece optical unit 3-2 can be described as common paths in that they are bent twice at the two inclined planes of the light guide units $3b_1$ and $3b_2$. However, the optical axis path $L_1$ through the first eyepiece optical unit 3-1 and the optical axis path $L_2$ through the second eyepiece optical unit 3-2 differ in length as well as in position and direction they exit the respective light guide units $3b_1$, $3b_2$ into the eyeball 11. The optical axis path $L_1$ with the first eyepiece optical unit 3-1 is longer than the optical axis path $L_2$ with the second eyepiece optical unit 3-2. In addition, the optical axis path $L_1$ involves an exiting position at the front of the eyeball 11, as well as an exiting angle (as illustrated, θ) of substantially 0 degree in relation to the eyeball 11. In contrast, the optical axis path $L_2$ with the second eyepiece optical unit 3-2 involves an exiting position ahead to the right from the eyeball 11, as well as an exiting angle greater than 0 degree in relation to the eyeball 11. It should be noted that a part of the optical axis path that exits from the eyepiece optical unit into the eyeball center O is indicated by L in FIG. 1.

Figure 5:
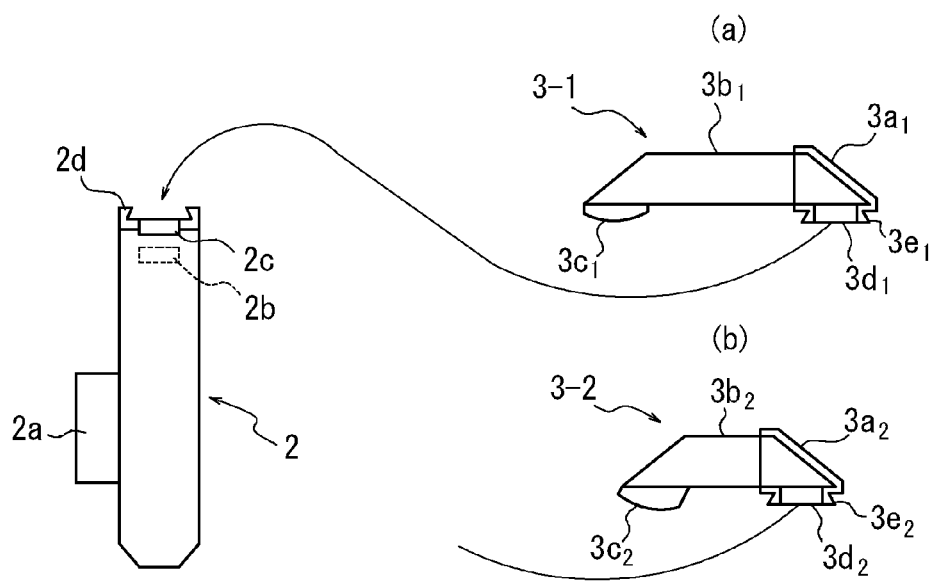
FIG. 5 is a diagrammatic representation for illustrating the configuration of the body unit as illustrated in FIG. 1, and for explaining how the eyepiece optical units are attached to the body unit.

FIG. 5 is a diagrammatic representation for illustrating the configuration of the body unit as illustrated in FIG. 1, and for explaining how the eyepiece optical units are attached to the body unit. The body unit 2 has a body-unit-side attachment portion 2d that comprises an exit window 2c at its tip. The exit window 2c includes an opening or a transparent member. The exit window 2c faces the light emitting surface of the display panel 2b and transmits image light from the display panel 2b.

On the other hand, mirror frames $3a_1$, $3a_2$ provided at the incident ends of the first and second eyepiece optical units 3-1, 3-2 have eyepiece-optical-unit-side attachment portions $3e_1$, $3e_2$ that comprise incident windows $3d_1$, $3d_2$. Each of the incident windows $3d_1$, $3d_2$ includes an opening or a transparent member. The eyepiece-optical-unit-side attachment portions $3e_1$, $3e_2$ may be slidably fit into a groove included in the body-unit-side attachment portion 2d, by which the eyepiece optical units 3-1, 3-2 are attached to and held on the body unit 2. That is, the body-unit-side attachment portion 2d and the respective eyepiece-optical-unit-side attachment portions $3e_1$, $3e_2$ together form an attachment portion, an attachment portion 4. At this point, the exit window 2c comes in contact with the respective incident windows $3d_1$, $3d_2$ in an opposing relationship to each other. This allows image light from the display panel 2b to be incident into the eyepiece optical units 3-1, 3-2. The eyepiece optical units 3-1, 3-2 may also be removed from the body unit 2. The user may selectively use the first eyepiece optical unit 3-1 and the second eyepiece optical unit 3-2 as appropriate. It should be noted that when replacing the eyepiece optical units 3-1 and 3-2 (i.e., when switching the optical axis path from one to another), it is not necessary to separately adjust the relative position relationship between the image output unit 2b and the eyeball 11. This is because the image output unit 2b has a fixed relative position with respect to the eyeball 11 and the optical systems can be replaced by changing only the eyepiece optical units.

Figure 6:
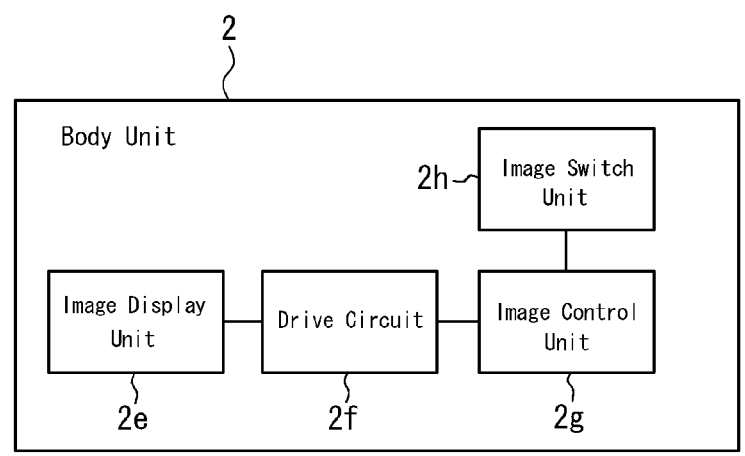
FIG. 6 is a functional block diagram of a control system of the body unit as illustrated in FIG. 1.

FIG. 6 is a functional block diagram of a control system of the body unit as illustrated in FIG. 1. An image control unit 2g supplies to a drive circuit 2f an image signal of an image to be displayed. The drive circuit 2f drives an image display unit 2e to allow image light to be output from the display panel 2b. In addition, an image switch unit 2h supplies to the image control unit 2g a switching signal for switching between a first display image corresponding to the first eyepiece optical unit and a second display image corresponding to the second eyepiece optical unit. For example, the user may switch between display images by selecting an optimum display image to be input to the image switch unit 2h, or identifying the eyepiece optical unit 3-1 or 3-2 to which the image switch unit 2h is attached in order to select an optimum display image.

Additionally, for example, the image switching means 2h identifies whether the connected eyepiece optical unit is for non-see-through display or for see-through display. In either case, the image switching means 2h supplies a switching signal for switching between a non-see-through display mode and a see-through display mode to the image control unit 2g. This causes the control unit 2g to, for example, provide luminance control depending on the brightness of the outside world since images are displayed to be superposed on the outside world in the see-through display mode, and in particular, during bright daylight hours, to dynamically change the luminance so that images are displayed at a high luminance as compared with that in the non-see-through display mode. On the other hand, as compared with the see-through display mode, less luminance change is required in the non-see-through display mode. Thus, the control unit provides control to, for example, switch display of image for image viewing as needed.

With this configuration, the user may select and use an appropriate eyepiece optical unit from the first eyepiece optical unit 3-1 and the second eyepiece optical unit 3-2 according to the application by removing/attaching the eyepiece optical unit to switch from one to another. When the first eyepiece optical unit 3-1 is used, image light output from the display panel 2b passes along the optical axis path $L_1$ through the light guide unit $3b_1$ of the first eyepiece optical unit 3-1, and then is directly incident from the eyepiece lens $3c_1$ on the right eyeball 11 of the user from the front side. As a result, a display image is displayed in front of the visual field of the right eyeball of the user. At this point, since the light guide unit $3b_1$ comprises the tip having a width greater than 4 mm, the display image is displayed as a non-see-through image in front of the visual field of the right eyeball of the user.

Alternatively, when the second eyepiece optical unit 3-2 is used, image light output from the display panel 2b passes along the optical axis path $L_2$ through the light guide unit $3b_2$ of the second eyepiece optical unit 3-2, and then is diagonally incident from the eyepiece lens $3c_2$ on the right eyeball of the user from ahead to the right. As a result, a display image is displayed on the far right portion of the visual field of the right eyeball of the user. At this point, since the light guide unit $3b_1$ comprises the tip having a width of 4 mm or less, the display image is displayed as a see-through image on the right end of the visual field of the right eyeball of the user.

As described above, according to this embodiment, it is possible to switch the optical axis path from one to another between the image output unit and the eyeball by replacing the eyepiece optical units, allowing appropriate images to be selected for different situations.

In addition, an attachment portion is positioned at a position without interference with a visual field through the spectacles Vg that can be seen by the user through the spectacle lens. Accordingly, the position of a display image in the visual field can be easily selected by replacing the eyepiece optical units. In addition, there is no need to prepare an entire head-mounted type display device separately, which is also advantageous in terms of costs. For example, for applications where one should monitor images continuously, images may be positioned in front of the visual field; and for other applications where one should check images in time in favor of the outside visual field, such as in mobile environments, images may be displayed on the end of the visual field. Moreover, since the eyepiece optical units 3-1, 3-2 may be attached and removed by sliding the eyepiece-optical-unit-side attachment portions $3e_1$, $3e_2$ into the body-unit-side attachment portion 2d, the users can easily replace the eyepiece optical units 3-1, 3-2 by themselves. Meanwhile, it is preferable that both window portions of the attachment portion are protected with transparent members, which permits cleaning of any dirt.

Furthermore, since the image display can be selected by the image switch unit 2h of the body unit 2, appropriate images may be selected and used depending on the mounted eyepiece optical unit 3.

In addition, since the attachment portion 4 is positioned at a position without interference with the visual field through the spectacles Vg, it may also be used in daily life or mobile environments, without an attachment portion of a relatively large size that would interfere with the visual field that can be seen through the spectacles when viewing the outside world. Moreover, when not used, the eyepiece optical units 3-1, 3-2 need only to be removed so that they cannot interfere with the visual field through the spectacles Vg at all.

Furthermore, when a first eyepiece optical unit is used that comprises the tip portion having a width of projection section in a user's visual axis direction greater than the pupil diameter, images are displayed in a non-see-through manner. On the other hand, when a second eyepiece optical unit is used that comprises the tip portion having a width of projection section in a user's visual axis direction smaller than the pupil diameter, images are displayed in a see-through manner. At this point, since image display modes can be selected by the image switch unit 2h of the body unit 2, the display mode can be switched to such an image display method that provides appropriate luminance adjustment depending on whether the mounted eyepiece optical unit is for non-see-through or see-through display.

In addition, since the image output unit 2b is located outside the visual axis, the frontal outside visual field can be ensured with ease, suitable for use in mobile environments. Due to the optical axis path being bent twice, it is also easy to change the position at which an image is displayed within the visual field by changing the positions at which the optical axis path is bent so that the first and second eyepiece optical units have different lengths, or so that the position and angle at which the optical axis path exits from the eyepiece optical unit is changed. If the optical axis path is bent more than twice, display positions are changed more easily. Furthermore, the optical axis paths $L_1$, $L_2$ are provided to pass through the eyeball center, which makes images less susceptible to shading, allows the user to view images with ease, and eliminates the need for providing positioning means for adjusting the positions of the optical axis paths with respect to the eyeball of the user.

As can be seen from the above, according to this embodiment, image display methods may be selected at a low cost depending on different situations and the visual field may be ensured to accommodate applications in mobile environments or always-on applications.

(Variation)

Figure 7:
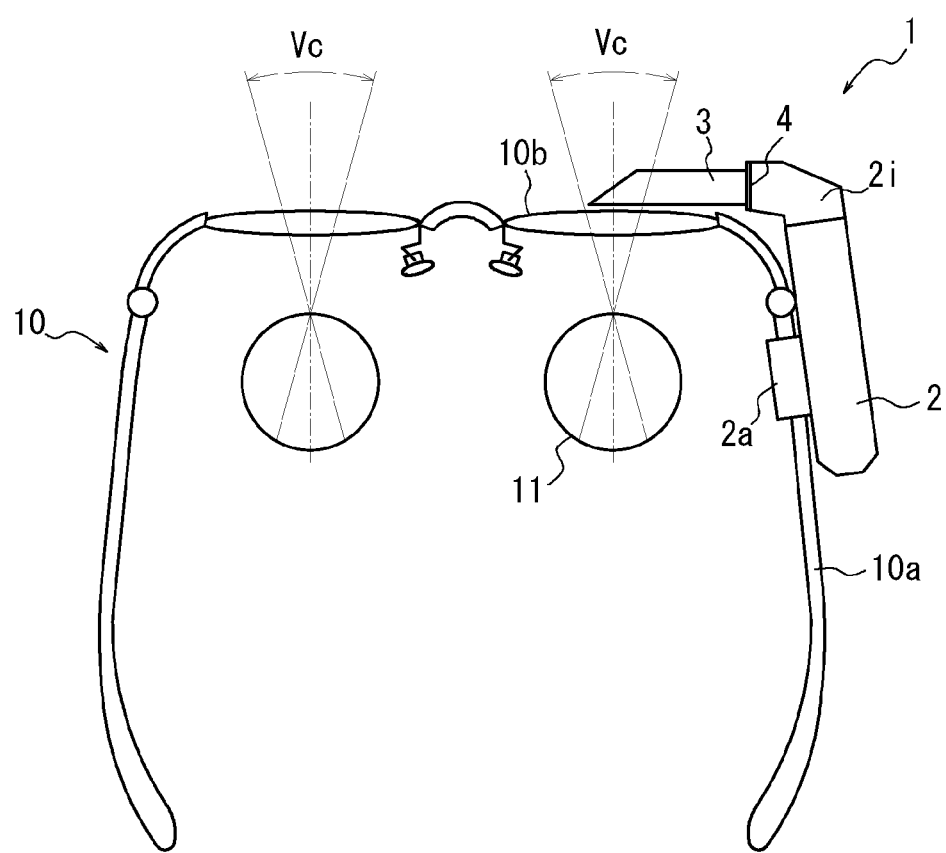
FIG. 7 illustrates a variation of the head-mounted type display device according to the first embodiment.

FIG. 7 illustrates a variation of the head-mounted type display device according to the first embodiment. This variation is different from the first embodiment in that a mirror frame 2i is coupled to the body unit 2 and that the attachment portion 4 is provided between the eyepiece optical unit 3 and the mirror frame 2i. The attachment portion 4 is provided at a position without interference with a central visual field Vc corresponding to a range of visual field of 30 degrees about the line of sight in frontal view. Other arrangements and operations are similar to those described in the first embodiment, and so the same components have been given the same reference numbers and will not be explained again here.

In general, the human eye has a "central visual field" in which observed objects can be recognized to details and a "peripheral visual field" on the periphery thereof. It is thought that the central visual field Vc is within a range of about 30 degrees about the line of sight in frontal view (i.e., within a range of about 15 degrees in each direction from the center of the line of sight). According to this variation, since the attachment portion 4 is positioned at a position without interference with the central visual field, the outside visual field may be ensured and this variation may also be used in mobile environments or daily life.

Second Embodiment

Figure 8:
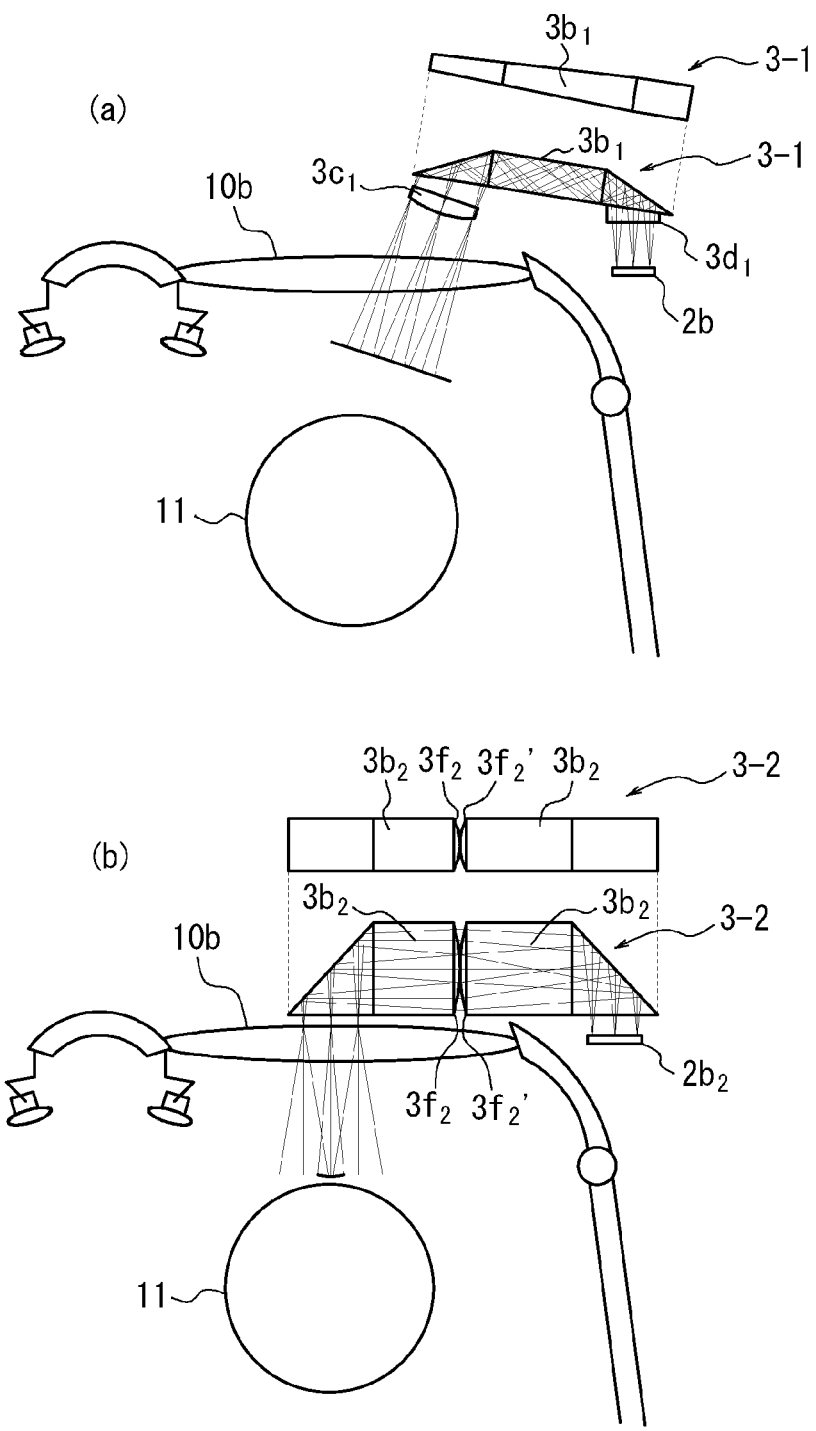
FIG. 8 is a diagram for explaining respective optical systems when first and second eyepiece optical units of a head-mounted type display device according to a second embodiment of the present invention are used.

FIG. 8 is a diagram for explaining respective optical systems when first and second eyepiece optical units of a head-mounted type display device according to a second embodiment of the present invention are used. FIGS. 8(a) and 8(b) each illustrate, as viewed from above, a portion including the display panel 2b and the first eyepiece optical unit 3-1 or the second eyepiece optical unit 3-2 with the eyepiece optical units 3-1 and 3-2 mounted on the spectacles, along with the shape of each light guide unit $3b_1$, $3b_2$ as viewed from the eyeball 11 (as illustrated at the top of the figures).

As illustrated in FIG. 8(a), the first eyepiece optical unit 3-1 has a light guide unit $3b_1$, an eyepiece lens $3c_1$ and an incident window $3d_1$. Image light incident from the display panel 2b on the incident window $3d_1$ propagates through the light guide unit $3b_1$ while being reflected internally, exits the eyepiece lens $3c_1$, and then is diagonally incident on the front right side of the eyeball.

The light guide unit $3b_1$ is configured in such a way that image light is reflected from its internal surfaces, excluding the plane of incidence and the plane of exit, and that the incident image light is reflected five times in a zigzag manner internally within the light guide unit $3b_1$ and exits from the light guide unit $3b_1$ toward the eyeball 11. In addition, when viewed in the visual axis direction from the user, the width of the light guide unit $3b_1$ in the vertical direction is reduced from the incident side toward the exit side of the image light, and tapers to 2.6 mm at the tip portion.

To describe the optical system of FIG. 8(a) in terms of the optical axis path, as illustrated in FIG. 8(c), the optical axis path $L_1$ running from the display panel 2b to the eyeball 11 is bent five times within the light guide unit $3b_1$, and exits from an exit position ahead to the right as viewed from the eyeball 11 toward the eyeball 11 at a predetermined inclination angle (θ) with respect to the eyeball 11.

On the other hand, as illustrated in FIG. 8(b), the second eyepiece optical unit 3-2 has lenses with positive power positioned in the middle of the light guide unit $3b_2$, without providing an eyepiece lens on the plane of exit. The lenses with positive power are configured with, for example, opposing two convex lenses $3f_2$ and $3f_2'$. The light guide unit $3b_2$ extends to the front of the eyeball 11 of the user. Then, image light output from the display panel 2b passes through the light guide unit $3b_2$ so as to be incident on the eyeball 11 from the front side.

The image light incident from the display panel 2b on the light guide unit $3b_2$ is reflected from one inclined plane of the light guide unit $3b_2$ at the incident side, then passes through the light guide unit $3b_2$ in the longitudinal direction, and then is refracted by the lenses $3f_2$, $3f_2'$. Then, the image light proceeds further through the light guide unit $3b_2$ in the longitudinal direction, and then is reflected from the other inclined plane at the exit side so as to exit from the second eyepiece optical unit toward the eyeball 11. As such, within the light guide unit $3b_2$, the image light is reflected twice from the two inclined planes before exit, first at the incident side and then at the exit side. As illustrated in FIG. 8(b), when viewed in the visual axis direction from the user, the light guide unit $3b_2$ has substantially the same width in the vertical direction at the incident side and the exit side, which is about 8 mm.

To describe the optical system of FIG. 8(b) in terms of the optical axis path, as illustrated in FIG. 8(d), the optical axis path $L_2$ running from the display panel 2b to the eyeball 11 is bent twice within the light guide unit $3b_2$, and exits from an exit position at the front, as viewed from the eyeball 11, toward the eyeball 11 in a direction substantially vertical (at an inclination angle of 0 degree) to the eyeball 11.

Exemplary specifications of first and second eyepiece optical units in this embodiment are illustrated in FIGS. 9(a) and 9(b), respectively.

Figure 10:
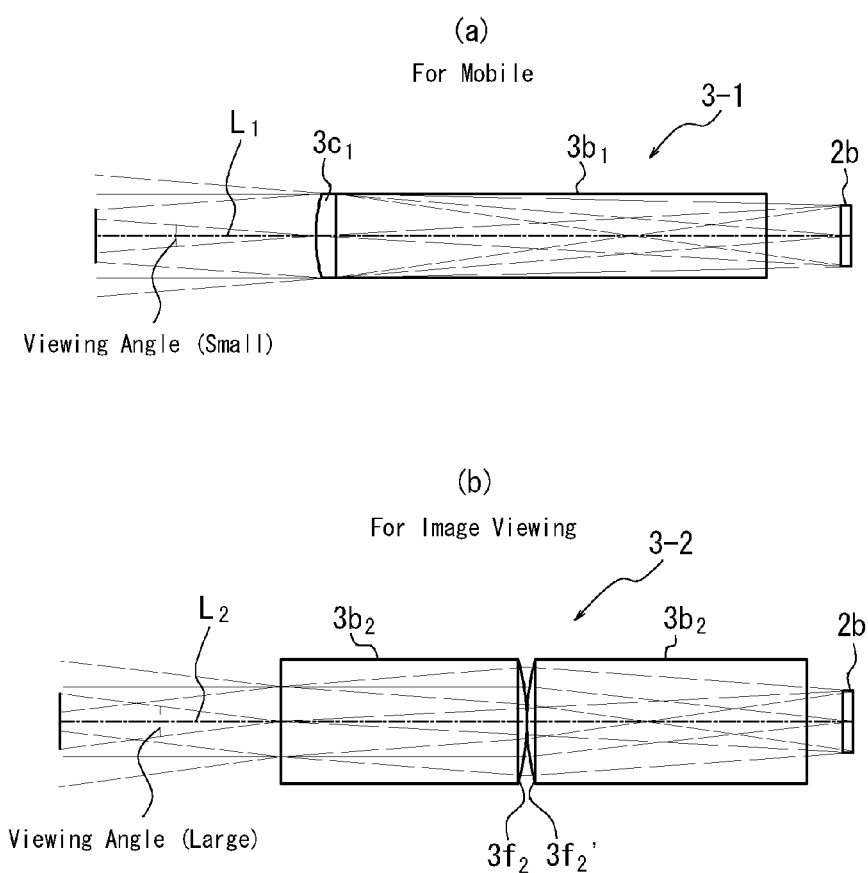
FIG. 10 is a diagram for explaining the respective optical systems of the eyepiece optical units as illustrated in FIG. 8.

FIG. 10 is a diagram for explaining the respective optical systems of the eyepiece optical units 3-1, 3-2 as illustrated in FIGS. 8 and 9, in which the optical systems are illustrated in a linear fashion as viewed in a horizontal direction without considering reflection on the optical path. The first eyepiece optical unit 3-1 for mobile applications has a small viewing angle at which the display panel 2b is seen from the eyeball. Thus, the eyepiece lens $3c_1$ having a long focal length is provided at the exit window of the light guide unit $3b_1$, which exit window is located farthest from the display panel 2b. Furthermore, the image light is reflected five times within the light guide unit $3b_1$, which results in a substantial increase in optical path length. In contrast, the second eyepiece optical unit 3-2 has a large viewing angle at which the display panel 2b is seen from the eyeball. Thus, the lenses $3f_2$, $3f_2'$ having a short focal length and positive power are positioned in the middle of the light guide unit $3b_2$. As can be seen from the above, the first eyepiece optical unit 3-1 and the second eyepiece optical unit 3-2 have a different relative position relationship between an eyepiece lens and said image output unit.

In addition, the body unit 2 has a similar control system to that of the body unit 2 according to the first embodiment of FIG. 6. For the first eyepiece optical unit 3-1, image light is reflected five times within the light guide unit $3b_1$, whereas for the second eyepiece optical unit 3-2, image light is reflected twice within the light guide unit $3b_2$. Thus, images are reversed left to right, depending on whether the first eyepiece optical unit 3-1 or the second eyepiece optical unit 3-2 is used. Consequently, when the first eyepiece optical unit 3-1 is used, an image (a second display image) that is to be displayed by the image display unit 2e on the display panel 2b may be reversed left to right by the image switch unit 2h in response to the user's manipulation, or by the image control unit 2g detecting the mounted eyepiece optical unit and based on this manipulation or the results of detection via the drive circuit 2f. Other arrangements are similar to those described in the first embodiment, and so the same components have been given the same reference numbers and will not be explained again here.

With this configuration, when the first eyepiece optical unit 3-1 is used, as illustrated in a conceptual diagram of FIG. 11(a), an image 6a is displayed in a small screen on the right side around the center line of the visual field. In addition, since the eyepiece optical unit 3-1 is used that comprises the tip portion having a width smaller than 4 mm, which is a diameter of the human pupil in normal environments, images are displayed as see-through images in which the background can be seen through. Alternatively, when the second eyepiece optical unit 3-2 is used, as illustrated in FIG. 11(b), an image 6b is displayed in a large screen at a position including the center line of the visual field. Moreover, since the eyepiece optical unit 3 is used that comprises the tip portion having a width greater than 4 mm of the pupil diameter, the background is blocked due to the non-see-through and images can be observed without any obstruction by the background.

As described above, this embodiment allows a single head-mounted type display device 1 to be used both for mobile and image viewing applications in favor of ensuring the visual field by just replacing the eyepiece optical units 3-1, 3-2 of the head-mounted type display device 1. There is no need to carry around two different types of head-mounted type display devices for different situations and applications. For mobile applications, this device is suitable for always-on use due to the existence of see-through display, and for image viewing applications, it is suitable for those users who want to view images in calm environments due to the existence of non-see-through display.

Moreover, the first eyepiece optical unit 3-1 may provide a thinner eyepiece optical unit while ensuring a large pupil diameter for exit, by employing an optical path being reflected five times in a zigzag manner internally within the light guide unit $3b_1$ (i.e., by bending the optical axis path $L_1$ five times). This internal zigzag reflection may contribute to an increase in optical path length (i.e., an increase in length of the optical axis path). In addition, using a lens having a longer focal length may offer such effects that the viewing angle can be reduced at which the display panel is seen from the eyeball. Furthermore, since display images are displayed on the right side within the user's visual field while ensuring the optical path, the entire length of the eyepiece optical unit 3-1 may also be reduced. On the other hand, the second eyepiece optical unit 3-2 involves two reflections (i.e., bending the optical axis path $L_2$ twice). The second eyepiece optical unit 3-2 may provide an optical path running through the light guide unit $3b_2$ along the longitudinal direction and minimize the optical path length between the incident end and the exit end so that the entire length of the eyepiece optical unit 3-2 becomes relatively long. That is, it is usually the case that the smaller viewing angle a lens uses, the longer the optical length becomes, and the larger viewing angle a lens uses, the shorter the optical length becomes. However, according to this embodiment, such an optical system may be provided where the length of the eyepiece optical unit becomes smaller when using a lens having a smaller viewing angle, and the length of the eyepiece optical unit becomes larger when using while using a lens having a larger viewing angle.

It should be noted that while image light has been described in the context of being reflected five times within the light guide unit $3b_1$ of the first eyepiece optical unit 3-1, it is not so limited. If there is a larger number of reflections than that provided within the light guide unit $3b_2$ of the second eyepiece optical unit 3-2, i.e., more than two reflections, then similar effects may be achieved by the use of appropriately configured optical systems. In addition, when switching between the eyepiece optical units 3-1 and 3-2, it is preferable that images may be observed by replacing only the eyepiece optical units 3-1, 3-2, while maintaining a fixed size and position of the display panel 2b. In this case, the user only needs to replace the eyepiece optical units 3 without the need for extra adjustment activities. Moreover, it is preferable if the display region used in the panel remains unchanged because no degradation in resolution occurs.

Third Embodiment

Figure 12:
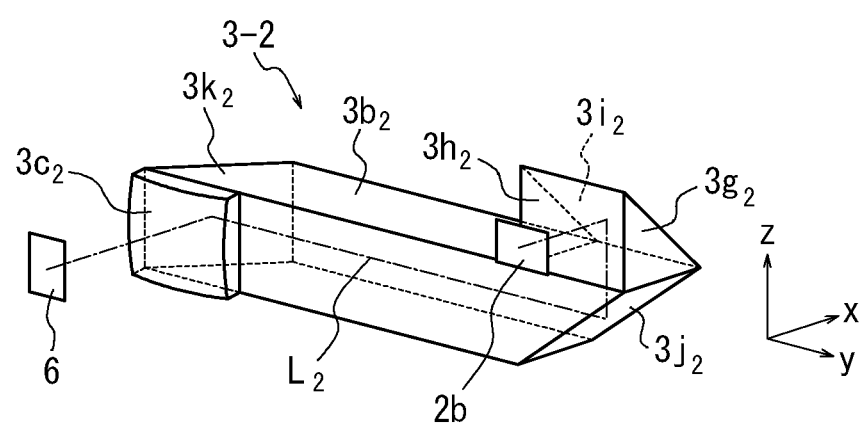
FIG. 12 is a diagram for explaining the configuration and operation of a second eyepiece optical unit applicable to a head-mounted type display device according to a third embodiment of the present invention.

FIG. 12 is a diagram for explaining the configuration and operation of a second eyepiece optical unit applicable to a head-mounted type display device according to a third embodiment of the present invention. In this embodiment, it is assumed that the second eyepiece optical unit of the first embodiment is replaced with a second eyepiece optical unit 3-2 of this embodiment as illustrated in FIG. 12. The replaced eyepiece optical unit may also be the first eyepiece optical unit.

The second eyepiece optical unit 3-2 as illustrated in FIG. 12 comprises a light guide unit $3b_2$ and an eyepiece lens $3c_2$. The light guide unit comprises a tip portion having a width of 4 mm or more. The light guide unit $3b_2$ is shaped as follows: a triangular prismatic portion (a prismatic portion $3g_2$) is added on the top portion of a rod-shaped light guide unit, wherein the rod-shaped light guide unit, which is arranged in a horizontal direction at the incident side, has a rectangular cross-section and inclined planes (reflecting surfaces $3j_2$ and $3k_2$) formed at either end in the longitudinal direction, and wherein the prismatic portion $3g_2$ has a plane of incidence $3h_2$ facing the display panel 2b when attached to the body unit 2, and a reflecting surface $3i_2$ for reflecting image light incident from this plane of incidence $3h_2$ 90 degrees downward.

The light guide unit $3b_2$ has one end at the incident side that is fit into a mirror frame not illustrated. The light guide unit $3b_2$ may be attached to the body by slidably fitting an eyepiece-optical-unit-side attachment portion provided at the mirror frame, not illustrated, into a body-unit-side attachment portion similar to that illustrated in FIG. 5. Other arrangements are similar to those described in the first embodiment, and so the same components have been given the same reference numbers and will not be explained again here.

With this second eyepiece optical unit 3-2, image light horizontally incident from the display panel 2b is reflected downward from the reflecting surface $3i_2$, reflected from the reflecting surface $3j_2$, passes through the light guide unit $3b_2$ in the longitudinal direction, then is reflected again from the reflecting surface $3k_2$ so as to exit from the eyepiece lens $3c_2$ toward the eyeball 11 of the user. Provided here that, when the user faces front, the visual axis direction of the eyeball represents the x axis, the longitudinal direction of the light guide unit $3b_2$ represents the y axis, and the vertical direction represents the z axis. Then, the reflecting surface $3i_2$ is parallel to the y axis and forms an angle of about 45 degrees with respect to the x axis and the z axis; the reflecting surface $3j_2$ is parallel to the x axis and forms an angle of about 45 degrees with respect to the y axis and the z axis; and the reflecting surface $3k_2$ is parallel to the z axis and forms an angle of about 45 degrees with respect to the x axis and the y axis.

The above-mentioned optical system of FIG. 12 will be described again in terms of the optical axis path. The optical axis path $L_2$ running from the display panel 2b to the eyeball 11 first extends from the display panel 2b toward a direction along the x axis until it is bent by the reflecting surface $3i_2$ by 90 degrees; then extends toward a direction along the z axis until it is bent by the reflecting surface $3j_2$ by 90 degrees; then extends toward a direction along the y axis until it is further bent by the reflecting surface $3k_2$ by 90 degrees; and finally extends toward a direction along the x axis, the direction of the eyeball 11 (toward a direction opposite to the output direction of the display panel 2b). As can be seen from this reflection, the optical axis path $L_2$ has a path extending in the z axis direction in addition to the x axis and y axis directions. Thus, the entire optical axis path $L_2$ is present across a plurality of planes, rather than on the same plane. In this way, the optical axis path is sequentially bent in three axis directions orthogonal to each other, by which image light of a display image passing through this optical axis path is rotated by 90 degrees.

Consequently, if a vertically long image is rotated by 90 degrees in a opposite direction to the above-mentioned rotation direction by the image switch unit 2h and displayed as a second display image on the horizontally long display panel 2b, then vertically long images may be displayed in a similar manner to that used in information terminals, such as mobile phones or smart phones.

Therefore, when viewing horizontally long images as found in television programs or movies, to observe these images as horizontally long images by using the first eyepiece optical unit 3-1 and display contents for information terminals, such as mobile phones or smart phones, the eyepiece optical unit 3-1 is replaced with the second eyepiece optical unit 3-2 and display methods are switched by the image switch unit 2h as described above. This allows the images to be observed as vertically long images, while making effective use of the entire display region of the horizontally long display panel 2b.

As described above, according to this embodiment, switching between the first eyepiece optical unit 3-1 for displaying horizontally long images and the second eyepiece optical unit 3-2 for converting horizontally long images into vertically long images to be used allows for switching between vertically long images and horizontally long images to be displayed by replacing only the eyepiece optical units, without replacing the head-mounted type display device itself. This may achieve suitable display of content in response to each screen orientation of content.

Similarly, if the first eyepiece optical unit of the first embodiment is replaced with the eyepiece optical unit 3-2 of this embodiment as illustrated in FIG. 12, then it is possible to switch between vertically long non-see-through images and horizontally long see-through images to be displayed.

It should be noted that the configuration of rotating image light is not limited to the one utilizing reflecting surfaces as described above, and so any other configuration of optical system may be used that would cause rotation of image light. In addition, the rotation of display image is not limited to the one from horizontally long images to vertically long images, but vice versa is also applicable. It is also possible to provide a rotation angle other than 90 degrees.

Fourth Embodiment

Figure 13:
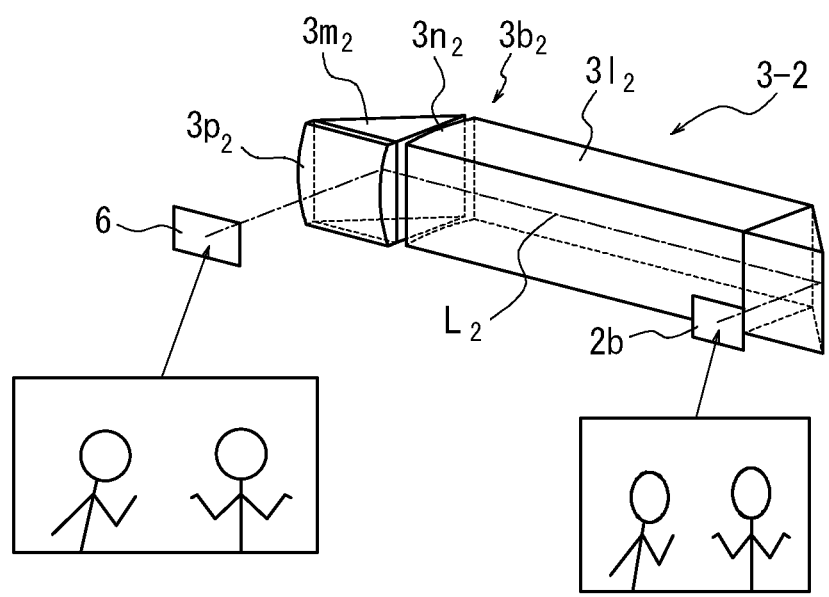
FIG. 13 is a diagram for explaining the configuration and operation of a second eyepiece optical unit applicable to a head-mounted type display device according to a fourth embodiment of the present invention.

FIG. 13 is a diagram for explaining the configuration and operation of an eyepiece optical unit applicable to a head-mounted type display device according to a fourth embodiment of the present invention. In this embodiment, it is assumed that the second eyepiece optical unit of the first embodiment is replaced with the second eyepiece optical unit 3-2 of this embodiment as illustrated in FIG. 13. The replaced eyepiece optical unit may also be the first eyepiece optical unit.

The light guide unit $3b_2$ of the second eyepiece optical unit 3-2 as illustrated in FIG. 13 has a tip portion $3m_2$ and a main portion $3l_2$ at the exit side that are separated as individual objects. Formed at the tip of the main portion $3l_2$ at the exit side is a lens (e.g., a cylindrical lens) $3n_2$ with power in a lateral direction (horizontal direction). In addition, the tip portion $3m_2$ has a triangular prismatic shape with the plane of incidence and the plane of exit forming an angle of 90 degrees. Positioned at the exit side of the plane of exit is a lens $3p_2$ with power in a perpendicular direction (vertical direction) and having a different focal length than that of the lens $3n_2$. The main portion $3l_2$ and the tip portion $3m_2$ are fixed in place and held together by the same holding member (such as a case) not illustrated. The resulting tip portion has a width of projection section in a user's visual axis direction of 4 mm or more. Other arrangements are similar to those described in the first embodiment, and so the same components have been given the same reference numbers and will not be explained again here.

With the second eyepiece optical unit 3-2 of this embodiment, image light incident from the display panel 2b is reflected from the inclined plane that is formed at the incident end of the main portion $3l_2$ of the light guide unit $3b_2$ to propagate through the light guide unit $3b_2$ in the longitudinal direction. The image light is refracted at the lens $3n_2$ only in the lateral direction, then incident on the tip portion $3m_2$, then is reflected from the reflecting surface formed at the inclined plane of the tip portion $3m_2$, then refracted by the lens $3p_2$ only in the perpendicular direction so as to exit from the tip portion toward the eyeball 11 of the user. At this point, the lens $3n_2$ with positive power in the lateral direction and the lens $3p_2$ with positive power in the perpendicular direction are provided with different focal lengths and displaced from each other. Accordingly, the magnification ratio of a display image that is displayed as a virtual image corresponding to an image to be displayed on the display panel 2b may be larger in the horizontal direction than in the vertical direction.

Therefore, when the display panel 2b has an aspect ratio of 4:3, for example, an image with an aspect ratio of 16:9 is compressed, by the image switch unit 2h, in the lateral direction to an image with an aspect ratio of 4:3, which in turn is displayed as a second display image on the display panel 2b. Then, this image may be displayed as an image with an aspect ratio of 16:9 within the user's visual field using the second eyepiece optical unit 3-2 of this embodiment in which the focal lengths of the lenses $3n_2$ and $3p_2$ are appropriately selected.

If such conversion of aspect ratio is not performed, then an image with black bars appearing on top and bottom as illustrated in FIG. 14(a) or an image with the sides cut off as illustrated in FIG. 14(b) should be displayed on the display panel 2b in order to display an image with an aspect ratio of 16:9. However, there are problems with these types of display: in the case of FIG. 14(a), the resolution is reduced since not all pixels of the display panel 2b can be effectively used, and in the case of FIG. 14(b), parts of each image are lost.

It should be noted that the conversion of aspect ratio is not limited to the one from 4:3 to 16:9, and so other configuration may be used that provides conversion from 16:9 to 4:3 or any other ratios. Furthermore, the lenses $3n_2$ and $3p_2$ as well as the arrangement thereof may be adjusted to achieve conversion according to various horizontal-to-vertical ratios.

As described above, according to this embodiment, since the second eyepiece optical unit is provided for conversion of aspect ratio, the user may easily switch between images having appropriate aspect ratios for viewing on a single device by replacing only the eyepiece optical units, without having to prepare two different types of head-mounted type display devices having separate display panels with different aspect ratios.

Similarly, if the first eyepiece optical unit of the first embodiment is replaced with the eyepiece optical unit 3-2 of this embodiment as illustrated in FIG. 12, then the user may switch between a non-see-through image and a see-through image having different aspect ratios to be displayed.

Fifth Embodiment

FIG. 15 is a diagram for explaining selection of eyepiece optical units depending on the width between the user's eyes when a head-mounted type display device according to a fifth embodiment of the present invention is used. It is assumed here that one eyepiece optical unit that is similar to the first eyepiece optical unit of the second embodiment and involves a relatively short distance between an incident portion and an exit portion of image light (i.e., length of the optical axis path in the eyepiece optical unit) is a first eyepiece optical unit 3-1, and the other with a relatively long distance is a second eyepiece optical unit 3-2. For example, adjustment of angles with respect to the inclined planes of the light guide units $3b_1$, $3b_2$ in the longitudinal direction and focal lengths of the eyepiece lenses $3c_1$, $3c_2$ allows for providing eyepiece optical units 3-1 and 3-2 having different lengths.

FIG. 15(a) illustrates a case where a first eyepiece optical unit 3-1 is applied to a user having a wider width between the eyes. Since the eyepiece optical unit 3-1 is relatively short, the eyepiece lens $3c_1$ is located further outward than when the second eyepiece optical unit 3-2 is used. As such, image light exits from the eyepiece lens $3c_1$ in a direction toward the eyeball center of the user, which image light in turn preferably passes through the eyeball center 11b of the user. Similarly, in FIG. 15(b), a second eyepiece optical unit 3-2 longer than the first eyepiece optical unit is used by a user having a narrower width between the eyes to allow image light to exit in a direction toward the eyeball center of the user, which image light in turn preferably passes through the eyeball center 11b. Human beings have different widths between the eyes (interpupillary distances): female around 56 to 62 mm; male around 60 to 68 mm. By changing the eyepiece optical units from one to another according to the width between the eyes of each individual, images may be viewed at a preferable position.

According to this embodiment, eyepiece optical units having different lengths may be prepared to provide the user with an optimum viewing environment at a low cost by replacing only the eyepiece optical units, without having to prepare separate head-mounted type display devices having different widths between the eyes for each individual.

Figure 16:
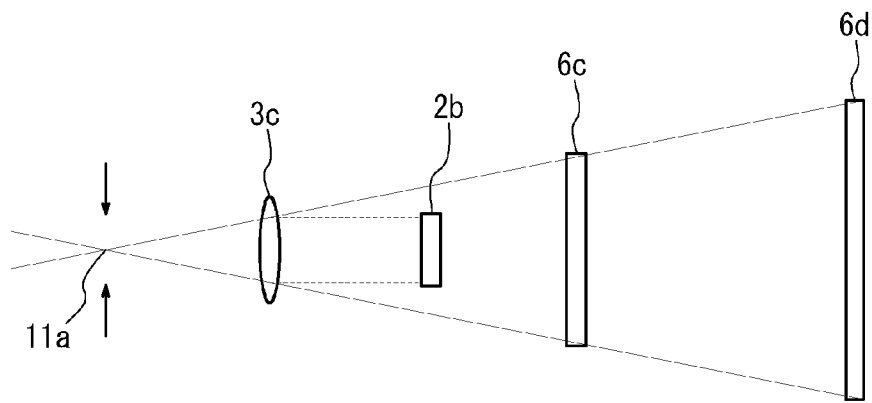
FIG. 16 is a diagram for explaining an optical system of the head-mounted type display device of the present invention.

A method of changing the diopter of an image displayed within the visual field of the eyeball of the user in the above-mentioned embodiments will now be described below. FIG. 16 illustrates an optical system of the head-mounted type display device. An image displayed on the display panel 2b passes via the lens 3c through the pupil 11a, after which it is displayed as a virtual image within the user's visual field. For example, as compared with an optical system configured to display a display image 6c at a short distance under appropriate conditions, if the eyepiece lens 3c has a shorter focal length, then a display image 6d is displayed at a longer distance for display within the visual field of the eyeball of the user.

Accordingly, for example, providing two eyepiece optical units with eyepiece lenses having different focal lengths for the first eyepiece optical unit and the second eyepiece optical unit allows for switching between eyepiece optical units having different diopters.

This allows an image without blurring to be displayed in a reasonable manner by selecting the diopter of the optical unit according to the diopter of the user's eye, the diopter of the spectacles used and so on. In addition, for example, by changing the distance at which virtual images are displayed depending on the usage environment, images may be displayed about 50 cm to 1 m ahead when the user occasionally checks images during desk work. This enables the images to be displayed as images easy to see due to less movement in the focal length of the eye. Moreover, it is preferable that images are displayed about 1 m to 3 m ahead when the user occasionally checks images while watching television or the like at home, or 2 m to infinite distance when the user occasionally checks images while watching the landscape outside.

It should be noted that the diopter may also be converted by changing the position relationship between the eyepiece lens 3c and the display panel 2b in addition to the focal length of the eyepiece lens 3c.

With this configuration capable of accommodating different diopters, users may easily accommodate diopters of individuals or spectacles or change the distance at which images are displayed according to the usage by only replacing the eyepiece optical units, without having to prepare multiple head-mounted type display devices. While there are technologies to incorporate an diopter adjustment mechanism, they could suffer from the problems associated with a limited range of adjustment, potential degradation in performance when largely departing from the design rules, and so on. In contrast, performing diopter adjustment by replacing the eyepiece optical units is advantageous because the eyepiece optical units can be replaced from one to another so that an eyepiece optical unit can be used that is optimally designed and has fewer limitations on the range of adjustment.

Sixth Embodiment

A sixth embodiment of the present invention is adapted to, in the head-mounted type display device according to the first to fourth embodiments, provide in the body unit an identification unit for identifying the type of an eyepiece optical unit attached with an attachment portion, and to control an image to be output to a display element by a control unit of the body unit depending on the type of the eyepiece optical unit identified by this identification unit.

Figure 17:
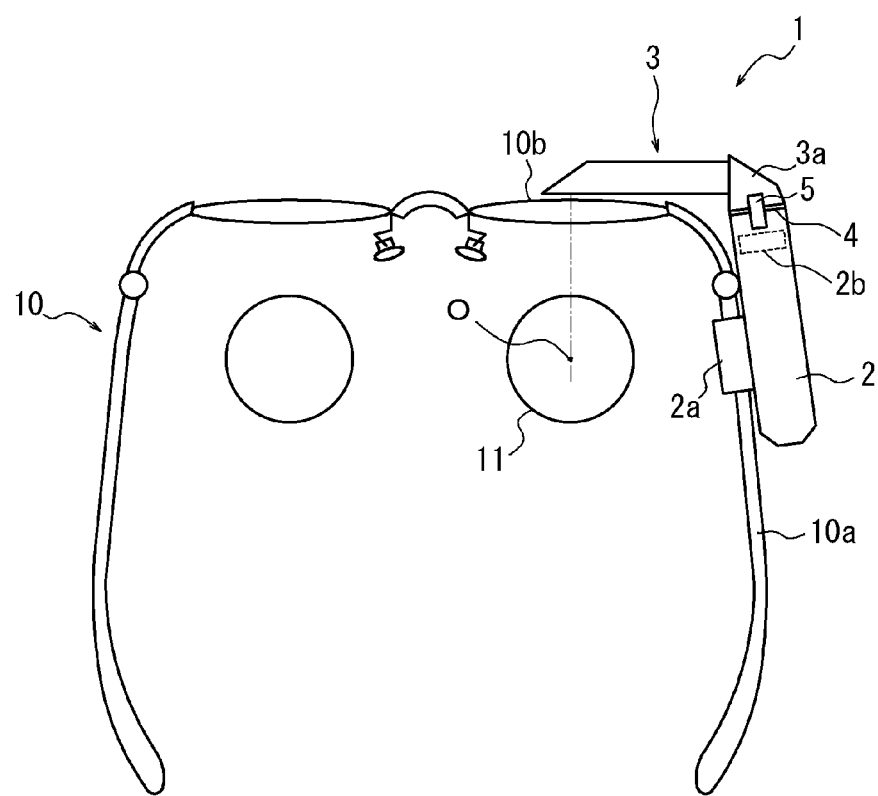
FIG. 17 illustrates a head-mounted type display device according to a sixth embodiment of the present invention mounted on spectacles.
Figure 18:
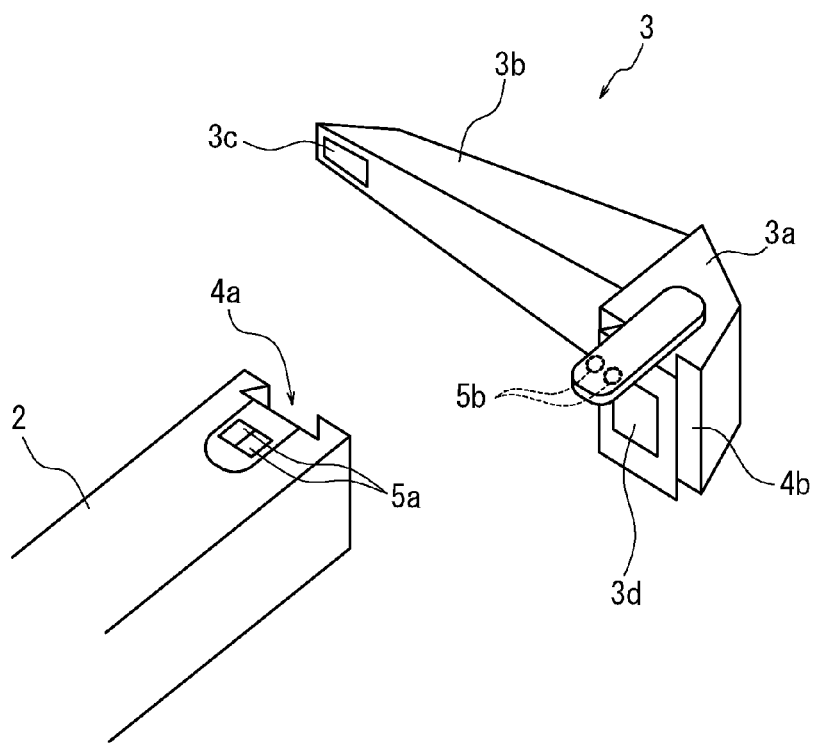
FIG. 18 is a perspective view illustrating how the body unit and the eyepiece optical unit of the head-mounted type display device as illustrated in FIG. 17 are attached to each other.

FIG. 17 illustrates a head-mounted type display device according to the sixth embodiment of the present invention mounted on the spectacles; and FIG. 18 is a perspective view illustrating how the body unit and the eyepiece optical unit of the head-mounted type display device as illustrated in FIG. 17 are attached to each other.

In this embodiment, an identification means 5 for identifying the type of the attached eyepiece optical unit 3 is provided in the body unit 2 of the head-mounted type display device according to the second embodiment.

The attachment portion 4, which attaches the body unit 2 to the eyepiece optical unit 3, includes, for example, a body-unit-side attachment portion 4a and an eyepiece-optical-unit-side attachment portion 4b, as illustrated in FIG. 18. The body-unit-side attachment portion 4a and the eyepiece-optical-unit-side attachment portion 4b have grooves that are formed to fit to each other. The eyepiece optical unit 3 is slid along these grooves so as to be attached to the body unit 2. In this case, an exit window (not illustrated), which allows image light to be output from the display panel 2b incorporated in the body unit 2, is formed at the body-unit-side attachment portion 4a. Once the eyepiece optical unit 3 is attached to the body unit 2 with the attachment portion 4, the exit window of the body unit 2 comes in contact with the incident window 3d of the eyepiece optical unit 3 in an opposing relationship to each other. As a result, the image light is incident from the incident window 3d of the eyepiece optical unit 3 into the eyepiece optical unit 3, and then guided via the light guide unit 3b into the visual field of the eyeball of the user.

The identification means 5 may be achieved by, for example, providing a body-side contact 5a on the periphery of the attachment portion 4 of the body unit 2, as well as an eyepiece-optical-unit-side contact 5b at a position where the eyepiece-optical-unit-side contact 5b comes in contact with the body-side contact 5a when connected to the eyepiece optical unit 3. In this case, the body unit 2 reads information about the type of the eyepiece optical unit 3 as electric signals via the body-side contact 5a and the eyepiece-optical-unit-side contact 5b, or reads identification information (ID information) indicative of the type of the eyepiece optical unit 3 from memory in the eyepiece optical unit 3 in which the identification information is stored, thereby identifying the type of the eyepiece optical unit 3.

Figure 19:
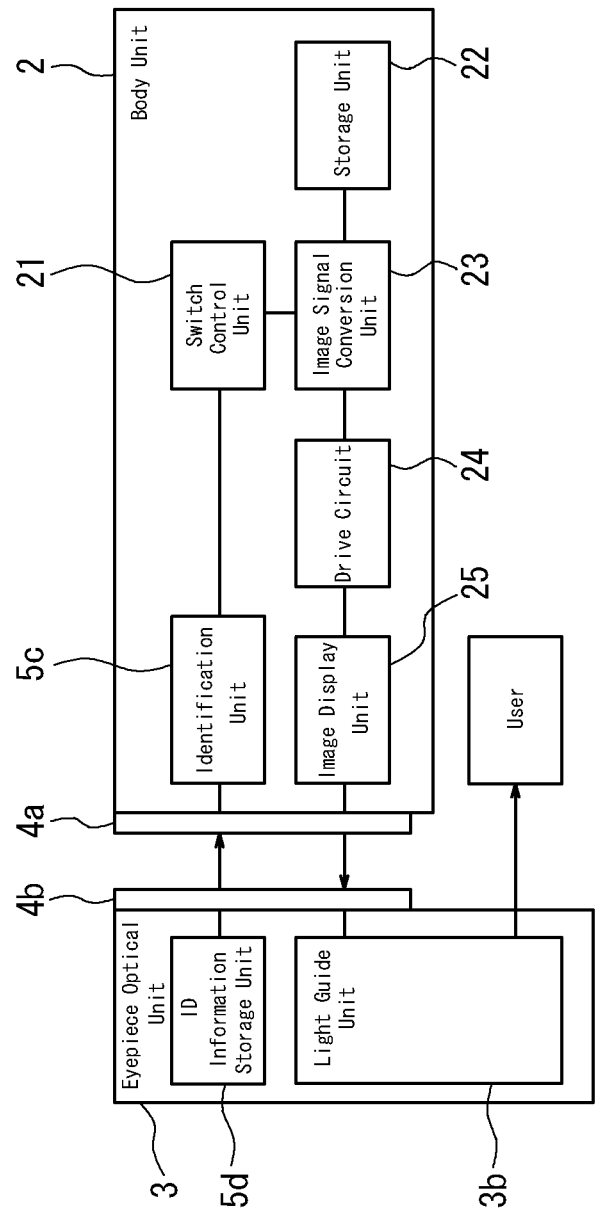
FIG. 19 is a block diagram of the head-mounted type display device as illustrated in FIG. 17.

FIG. 19 is a block diagram illustrating the head-mounted type display device of FIG. 17. The body unit 2 includes an identification unit 5c, a switch control unit 21, a storage unit 22, an image signal conversion unit 23, a drive circuit 24 and an image display unit 25. In addition, the eyepiece optical unit 3 has an identification information storage unit 5d for storing its identification information (ID information). In this case, the switch control unit 21 and the image signal conversion unit 23 together form a control unit.

Once the body unit 2 is connected to the eyepiece optical unit 3, the identification unit 5c reads the identification information stored in the identification information storage unit 5d via the body-unit-side and eyepiece-optical-unit-side contacts 5a, 5b, and identifies the type of the connected eyepiece optical unit, which in turn is output to the switch control unit 21. The switch control unit 21 sends an instruction to indicate which image is to be displayed on the image signal conversion unit 23 based on the identification information read by the identification unit 5c. The image signal conversion unit 23 reads the content selected from the image contents stored in the storage unit 22, and converts the image signal into a form suitable for display on the connected eyepiece optical unit 3 based on the instruction by the switch control unit 21, which in turn are output to the drive circuit 24. The drive circuit 24 drives the image display unit 25 to allow image light to be output from the display panel 2b. Other basic arrangements, and the form of the head-mounted type display device being mounted on the spectacles, are similar to those described in the first embodiment in conjunction with FIG. 17, and so the same components have been given the same reference numbers and will not be explained again here.

Hereinafter, consider that the first and second eyepiece optical units of the second embodiment as illustrated in FIGS.

8(*a*) and 8(*b*) are first and second eyepiece optical units of this embodiment, respectively. In addition, consider that the second eyepiece optical unit of the third embodiment as illustrated in FIG. 12 and the second eyepiece optical unit of the fourth embodiment as illustrated in FIG. 13 are third and fourth eyepiece optical units of this embodiment, respectively. In this embodiment, these four eyepiece optical units are attached to the body unit 2 in a replaceable manner.

With this configuration, in the head-mounted type display device 1, after attaching the eyepiece optical unit 3 selected from the first to fourth eyepiece optical units to the body unit 2 with the attachment portion 4, the body-side contact 5*a* and the eyepiece-optical-unit-side contact 5*b* of the identification unit 5 come in contact with each other. Then, the identification unit 5*c* reads identification information (ID information) of the eyepiece optical unit 3 from the identification information storage unit 5*d*, and identifies which eyepiece optical unit 3 is the connected eyepiece optical unit 3, the result of which is output to the switch control unit 21.

The switch control unit 21 selects appropriate image content as an image to be displayed based on the identification information (ID information), and instructs the image signal conversion unit 23 to provide conversion (control) of image signals depending on the eyepiece optical units. For example, in the first eyepiece optical unit, images are reversed left to right since image light is reflected within the light guide unit 3$b_1$ an odd number of times (five times). Consequently, when the first eyepiece optical unit is used, the switch control unit 21 instructs the image signal conversion unit 23 to output to the drive circuit 24 an image signal of the left-to-right reversed version of image content read from the storage unit 22. The drive circuit 24 drives the image display unit 25 to allow the image light to be output from the display panel 2*b*.

The image light exits from the exit window of the body unit 2 to be incident on the incident window 3*d* of the attached eyepiece optical unit 3, and then is guided through the light guide unit 3*b* to exit from the exit window toward the eyeball of the user. As a result, displayed within the visual field of the eyeball of the user on which the image light is incident are such images having properties, such as the position, size, diopter, see-through display/non-see-through display, horizontal-to-vertical ratio or aspect ratio, according to which one of the first to fourth eyepiece optical units is attached to the body unit.

In the following, how image content is selected by the switch control unit 21 depending on the type of an eyepiece optical unit and what is instructed to the image signal conversion unit 23 will be described.

Since the first eyepiece optical unit is used for mobile applications where users want to always put on the unit to check simple messages instantaneously, as illustrated in FIG. 20(*a*), a relatively small display image 6*e* is displayed at a position displaced from the center of the visual field as a see-through image. In addition, this eyepiece optical unit has a priority to ensure the outside visual field. Thus, if there are an image with detailed information based on texts in small print and another with minimally necessary information based on legible characters and icons, the latter is selected for display. This selection of display methods may be performed by the switch control unit 21 automatically based on the type of the eyepiece optical unit or in response to the user's manipulation.

In addition, when the first eyepiece optical unit is used, it is necessary to provide display images with a high luminance since the display images are affected by the background brightness due to see-through display. Preferably, an illuminance sensor for measuring forward brightness is provided at the body unit 2 or the eyepiece optical unit 3, thereby changing luminance of images depending on the measured brightness. Accordingly, the switch control unit 21 instructs the image signal conversion unit 23 to conduct luminance adjustment in addition to the above-mentioned left-to-right reversal.

As illustrated in FIG. 20(*b*), the second eyepiece optical unit displays a relatively large display image 6*f* in front of the visual field as a non-see-through image. Applications include viewing moving images such as movies and displaying detailed textual information. When the display image is a moving picture, the switch control unit 21 instructs the image signal conversion unit 23 to adjust luminance, contrast and color to be optimum for the moving picture. In addition, when the display image is a text, the switch control unit 21 makes an instruction to convert character size and layout to be suitable for text display in which more characters can be seen. It should be noted that since display images are less susceptible to the brightness of the outside world due to non-see-through display, luminance adjustment is not required according to the outside brightness, unlike as described in the first eyepiece optical unit.

In addition, upon connection of this third eyepiece optical unit, the switch control unit 21 instructs the image signal conversion unit 23 to rotate a vertically long image by 90 degrees in a direction opposite to the above-mentioned rotation direction before displaying it on the horizontally long display panel 2*b*, as is the case with the third embodiment. With this image conversion, vertically long images may be displayed in a similar manner to that used in information terminals, such as mobile phones or smart phones. In addition, when the storage unit 22 has both content for vertically long display and content for horizontally long display, the switch control unit 21 may be adapted to select a vertically long image based on the type of the eyepiece optical unit. FIGS. 21(*a*) and 21(*b*) each illustrate display examples of a horizontally long image and a vertically long image.

Furthermore, when the fourth eyepiece optical unit is attached to the body unit, the switch control unit 21 selects, for example, image content with aspect ratio of 16:9 from the storage unit 22. Then, if the display panel 2*b* has an aspect ratio of 4:3, the switch control unit 21 instructs the image conversion unit 23 to compress an image with an aspect ratio of 16:9 in the lateral direction and to display it as an image with an aspect ratio of 4:3 on the display panel 2*b*. Appropriate selection of the focal lengths of the lenses 3$n_2$ and 3$p_2$ of FIG. 13 allows a display image to be displayed as an image with an aspect ratio of 16:9 within the user's visual field.

It should be noted that there may be different methods of converting images depending on the type of the eyepiece optical unit, other than the above-mentioned method of converting image signals depending on the type of the eyepiece optical unit 3. For example, correction may be performed by the image signal conversion unit 23 converting image signals in response to an instruction by the switch control unit 21 depending on aberrations (particularly, such as distortion or chromatic aberrations) of the individual eyepiece optical units. Alternatively, the switch control unit 21 may also be provided in advance with information about the diopter of the individual user in addition to the type of the eyepiece optical unit, and adjustment may be performed by the image signal conversion unit 23 depending on the type of the eyepiece optical unit and the diopter of each individual.

As described above, according to this embodiment, the eyepiece optical units may be replaced with each other. Furthermore, the image signal conversion unit is adapted to convert an image signal based on a control signal generated by the switch control unit, depending on the type of the eyepiece optical unit identified by the identification unit, to switch between display forms of an image output from the display panel. As such, it is possible to switch the display form of an image from one to another with ease depending on different situations.

This switchable display form includes the following properties: size of display image, position in the visual field, diopter, see-through display/non-see-through display, vertically long image/horizontally long image, and aspect ratio. Accordingly, the eyepiece optical units may be switched from one to another according to the desired properties, allowing for display of desired display images at a low cost using a single device, without having to prepare a separate head-mounted type display device.

Seventh Embodiment

Figure 22:
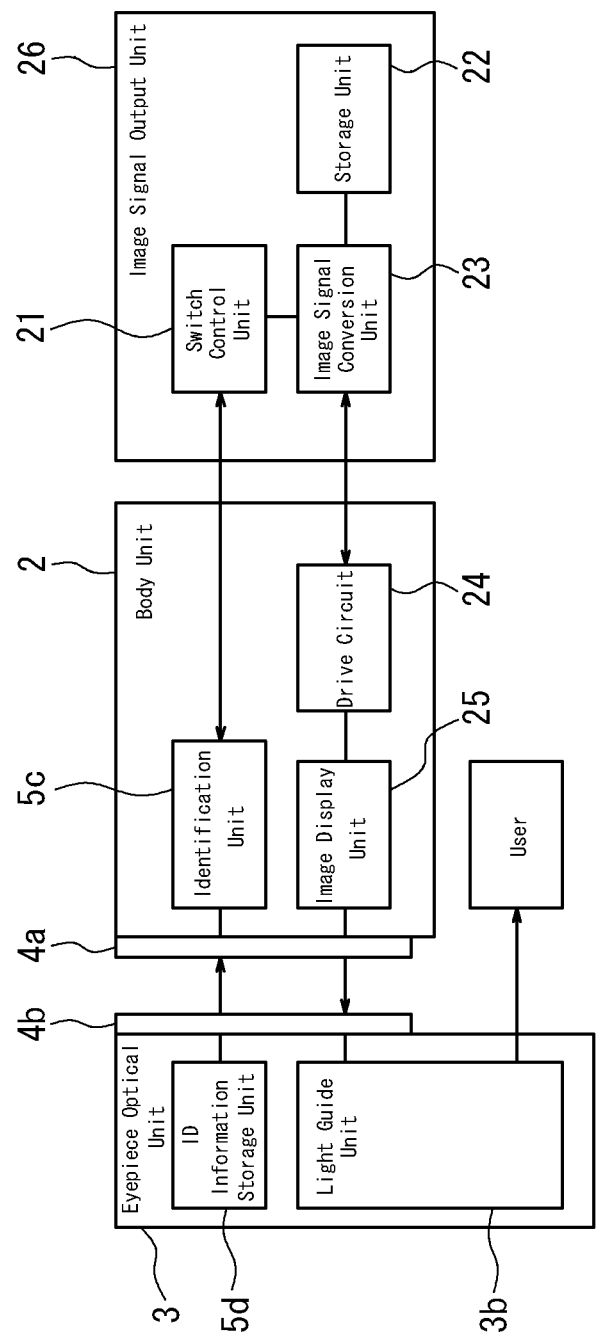
FIG. 22 is a block diagram of a head-mounted type display device according to a seventh embodiment of the present invention.

FIG. 22 is a block diagram of a head-mounted type display device according to a seventh embodiment of the present invention. This embodiment comprises, in the head-mounted type display device according to the sixth embodiment, an image signal output unit 26 separated from the body unit 2, and is adapted to have the switch control unit 21, the storage unit 22 and the image signal conversion unit 23 provided at the image signal output unit 26 rather than at the body unit 2. The image signal output unit 26, which is, for example, a personal computer, a portable image reproducing device or the like, is connected to the body unit 2 through wired or wireless communication means. Other arrangements and operations are similar to those described in the sixth embodiment, and so the same components have been given the same reference numbers and will not be explained again here.

According to this embodiment, since the image signal output unit is adapted to perform heavyweight functions, such as reproduction of image content or conversion of image signals, it is possible to reduce the weight and size of the body unit of the head-mounted type display device mounted on the human head. In addition, an existing personal computer or image reproducing device may be utilized as an image signal output unit to construct the entire device at a low cost.

It should be noted that the image signal output unit is not limited to the described form where image information is incorporated in a storage unit, and may obtain image information externally from the outside via communications. In this case, the storage unit 22 is not required. For example, a mobile phone terminal may be utilized as an image signal output unit.

Eighth Embodiment

Figure 23:
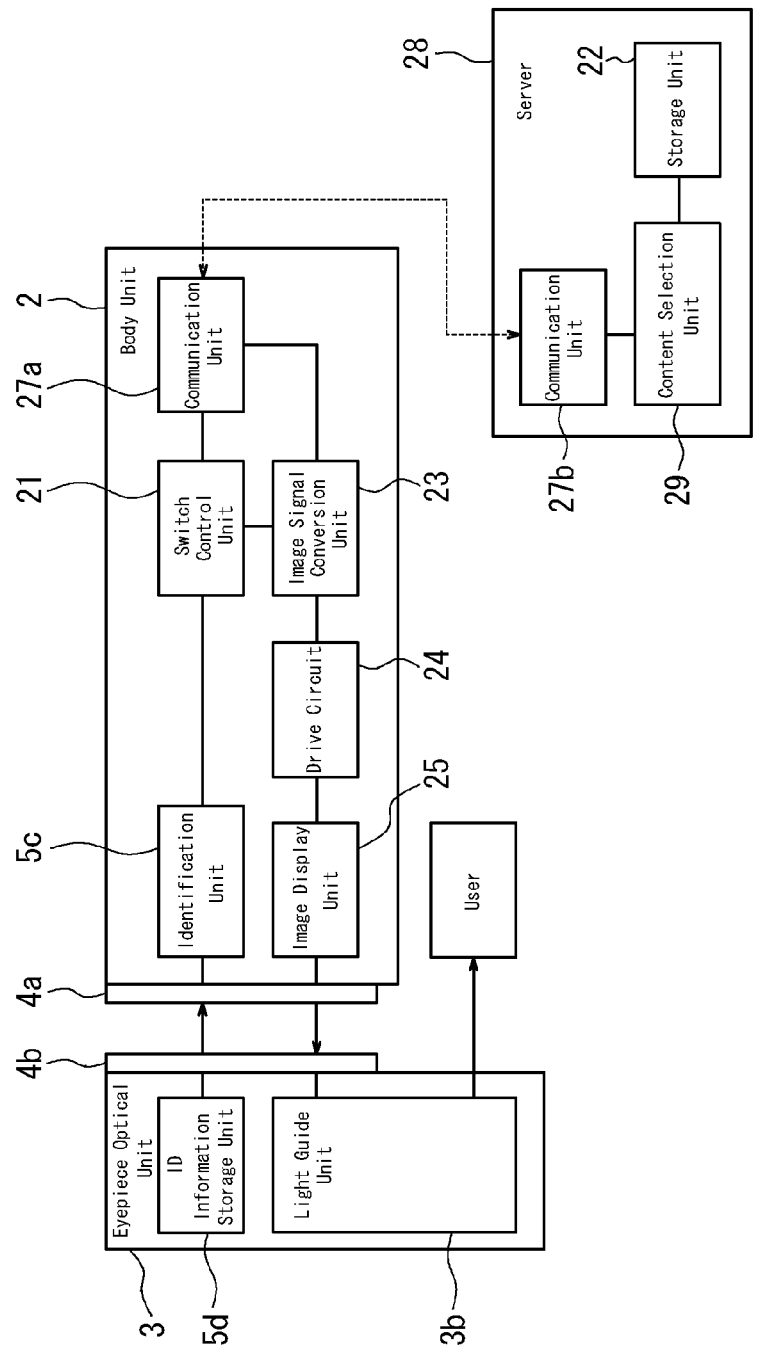
FIG. 23 is a block diagram of a head-mounted type display device according to an eighth embodiment of the present invention.

FIG. 23 is a block diagram of a head-mounted type display device according to an eighth embodiment of the present invention. This embodiment is such that, in the head-mounted type display device according to the sixth embodiment, the body unit 2 does not have a storage unit and is adapted to obtain image content from a server 28 that is wiredly or wirelessly connected thereto through a communication unit 27a. Accordingly, the switch control unit 21 and the image signal conversion unit 23 of the body unit 2 are connected to the communication unit 27a. On the other hand, the server 28 comprises a communication unit 27b in communication with the communication unit 27a, a storage unit 22 and a content selection unit 29. The switch control unit 21 of the body unit 2 transmits an instruction to transmit an image of content, together with identification information (ID information) of the eyepiece optical unit 3, to the content selection unit 29 via the communication units 27a, 27b. Based on the identification information (ID information) of the eyepiece optical unit 3, the content selection unit 29 selects content and transmits the selected image content to the image signal conversion unit 23 via the communication units 27a, 27b. Other arrangements and operations are similar to those described in the sixth embodiment, and so the same components have been given the same reference numbers and will not be explained again here.

According to this embodiment, a large amount of image content may be accumulated at the server side and read from the head-mounted type display device via communications, thereby increasing the number of contents available and thus providing greater convenience. Furthermore, since storage of image content and a part of operations for processing image signals are performed at the server side, a further reduction in weight and size of the head-mounted type display device may be achieved.

Ninth Embodiment

Figure 24:
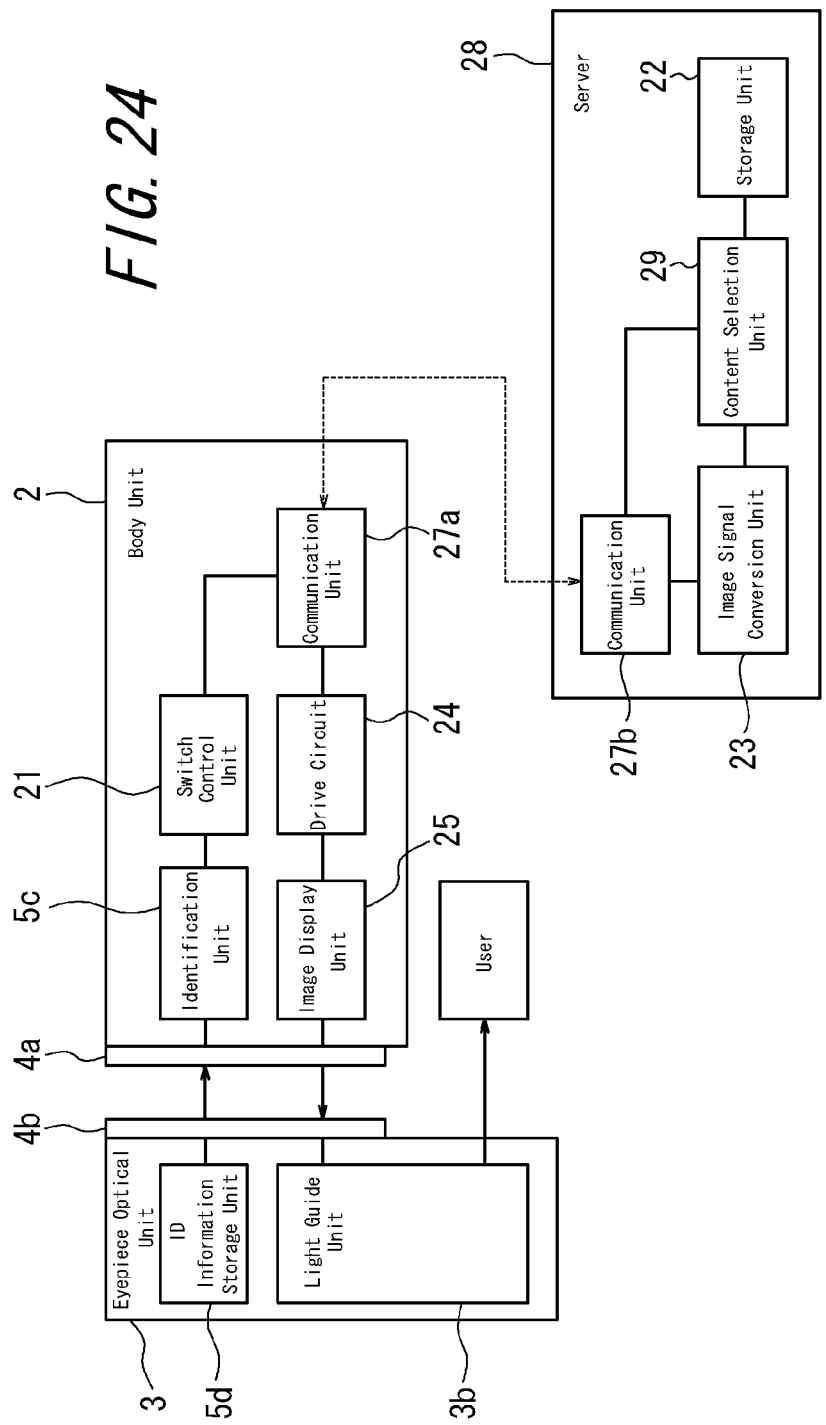
FIG. 24 is a block diagram of a head-mounted type display device according to a ninth embodiment of the present invention.

FIG. 24 is a block diagram of a head-mounted type display device according to a ninth embodiment of the present invention. This embodiment is adapted to, in head-mounted type display device according to the eighth embodiment, provide the image signal processing unit 23 at the server 28 rather than at the body unit 2. Accordingly, the switch control unit 21 of the body unit 2 transmits an instruction to the image signal conversion unit 23 and the content selection unit 29 of the server 28 via the communication units 27a, 27b. Then, the image signal conversion unit 23 transmits an image signal for which the display form is converted from one to another to the drive circuit 24 via the communication units 27a, 27b. Other arrangements and operations are similar to those described in the eighth embodiment, and so the same components have been given the same reference numbers and will not be explained again here.

According to this embodiment, in addition to the effects of the eighth embodiment, conversion of image signals is performed at the server 28 according to the display form. Thus, it is possible to achieve a further reduction in processing load on the body unit 2 as well as in weight and size of the head-mounted type display device.

Tenth Embodiment

Figure 25:
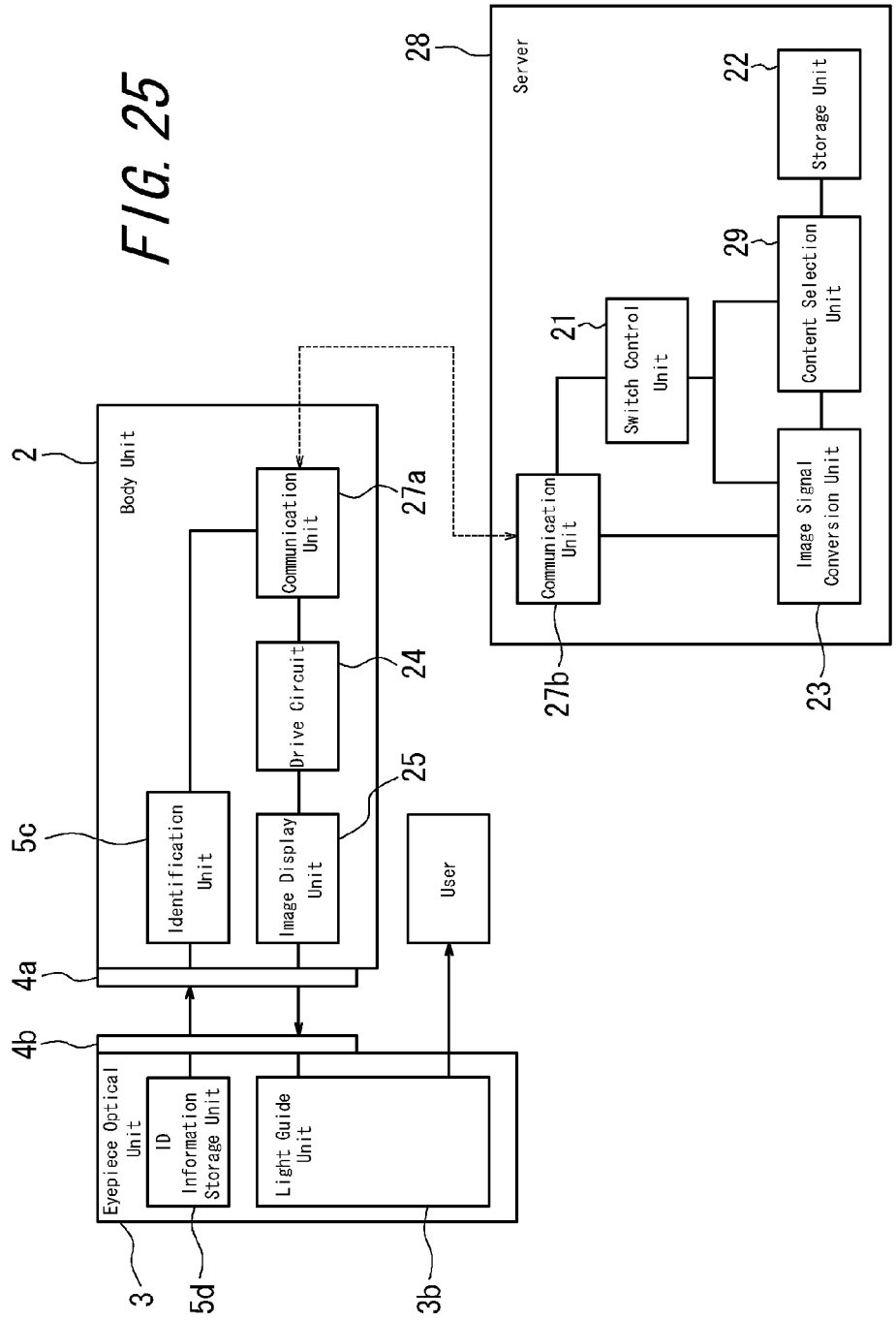
FIG. 25 is a block diagram of a head-mounted type display device according to a tenth embodiment of the present invention.

FIG. 25 is a block diagram of a head-mounted type display device according to a tenth embodiment of the present invention. This embodiment is adapted to, in the head-mounted type display device according to the ninth embodiment, provide the switch control unit 21 at the server 28 rather than at the body unit 2. Accordingly, the identification unit 5c of the body unit 2 transmits the type of the eyepiece optical unit (ID information) to the switch control unit 21 of the server 28 via the communication units 27a, 27b. Based on this, the switch control unit 21 transmits an instruction to the image signal conversion unit 23 and the content selection unit 29. Other arrangements and operations are similar to those described in the ninth embodiment, and so the same components have been given the same reference numbers and will not be explained again here.

According to this embodiment, in addition to the effects of the ninth embodiment, since the processing of the switch control unit 21 may also be performed at the server 28, it is possible to achieve a still further reduction in load on the body unit 2 as well as in weight and size of the head-mounted type display device.

It should be noted that the present invention is not limited only to the embodiments described above and many other variations or modifications are possible. For example, the head-mounted type display device is not limited to the spectacle-mounted type, but may be mounted on a helmet, on a spectacle frame without lens, and so on. In addition, for the spectacle-mounted type, it may also be of the type being integrally fixed to the spectacles, or of the type being removably attached to the spectacles. Moreover, the eye on which an image is displayed is not limited to the right eye, but may be the left eye. Alternatively, the same or different images may also be displayed on both eyes. The portion at which the body unit is fixed is not limited to the temple of the spectacles, but may be any other portion such as a hinge. Furthermore, the mechanism of the attachment portion is not limited to a method of slidably fitting the body and the eyepiece optical unit with respective grooves. Various other methods may also be used, such as providing an attachment bracket or fitting attachment.

REFERENCE NUMERALS

1 Head-mounted type display (spectacle type)
2 Body unit
2a Spectacle fixture unit
2b Display panel
2c Exit window
2d Body unit side attachment portion
2e Image display unit
2f Drive circuit
2g Image control unit
2h Image switch unit
2i Mirror frame
3 Eyepiece optical unit
3-1 First eyepiece optical unit
3-2 Second eyepiece optical unit
3a Mirror frame
$3b, 3b_1, 3b_2$ Light guide units
$3c, 3c_1, 3c_2$ Eyepiece lenses
$3d, 3d_1, 3d_2$ Incident windows
$3e_1, 3e_2$ Eyepiece optical unit side attachment portion
$3f_2, 3f_2'$ Lenses
$3g_2$ Prismatic portion
$3h_2$ Plane of incidence
$3i_2, 3j_2, 3k_2$ Reflecting surface
$3l_2$ Main portion
$3m_2$ Tip portion
$3n_2$ Lens
4 Attachment portion
5 Identification means
5a Body-side contact
5b Eyepiece-optical-unit-side contacts
5c Identification unit
5d Identification information storage unit
6 Displayed image
7 Blocked background
10 Spectacles
10a Spectacle frame (temple)
10b Spectacle lens
11 Eyeball
11a Pupil
11b Eyeball center
11c Retina
21 Switch control unit
22 Storage unit
23 Image signal conversion unit
24 Drive circuit
25 Image display unit
26 Image signal output unit
27a, 27b Communication units
28 Server
29 Content selection unit
31 Non-see-through Display Optical Eyepiece
32 See-through Display Optical Eyepiece
$L, L_1, L_2$ Optical axis paths
O Eyeball center

What is claimed is:

1. A head-mounted type display device comprising:
a support portion for fixture to a user's head;
a body unit fixed to the support portion and having an image output unit from which image output unit image light of an image to be displayed is output;
an eyepiece optical unit for allowing image light output from the image output unit to be incident on the eyepiece optical unit, for guiding the incident image light to the corresponding eyeball of the user with the support portion being fixed to the user's head, and for displaying, as a virtual image, a magnified version of the image from the image output unit within a user's visual field; and
an attachment portion for attaching the eyepiece optical unit to the body unit in a replaceable manner,
wherein the attachment portion attaches at least first and second eyepiece optical units in a replaceable manner, the first and second eyepiece optical units having different optical axis paths in optical systems for guiding the image light from the image output unit to the eyeball,
wherein one of the first eyepiece optical unit and the second eyepiece optical unit comprises a tip portion having a width of projection section in a user's visual axis direction narrower than a pupil diameter, while the other of the first eyepiece optical unit and the second eyepiece optical unit comprises a tip portion having a width of projection section in a user's visual axis direction wider than the pupil diameter, and
wherein the body unit comprises an image switch unit for switching at least between a see-through display mode in which a large range of change in luminance is set corresponding to the one eyepiece optical unit and a non-see-through display mode in which a small range of change in luminance is set corresponding to the other eyepiece optical unit.

2. A head-mounted type display device comprising:
a support portion for fixture to a user's head;
a body unit fixed to the support portion and having an image output unit from which image output unit image light of an image to be displayed is output;
an eyepiece optical unit for allowing image light output from the image output unit to be incident on the eyepiece optical unit, for guiding the incident image light to the corresponding eyeball of the user with the support portion being fixed to the user's head, and for displaying, as a virtual image, a magnified version of the image from the image output unit within a user's visual field; and
an attachment portion for attaching the eyepiece optical unit to the body unit in a replaceable manner,
wherein the attachment portion attaches at least first and second eyepiece optical units in a replaceable manner, the first and second eyepiece optical units having different optical axis paths in optical systems for guiding the image light from the image output unit to the eyeball,
wherein the head-mounted type display device further comprises:
an image signal output unit for outputting an image signal of the image to be displayed to the body unit, wherein the image output unit of the body unit comprises a display element for displaying the image to be displayed, wherein the body unit comprises an identification unit for identifying and outputting a type of the eyepiece optical unit attached with the attachment portion to the image signal output unit, wherein the image signal output unit comprises a control unit for controlling the image to the display element depending on the type of the eyepiece optical unit, and wherein the eyepiece optical unit comprises identification information for identifying the type readable by the identification unit.

3. The head-mounted type display device according to claim 2, wherein the display element displays an image with different display character sizes depending on the type of the eyepiece optical unit identified by the identification unit.

4. The head-mounted type display device according to claim 2, wherein the display element displays an image that is reversed upside down and/or left to right depending on the type of the eyepiece optical unit identified by the identification unit.

5. The head-mounted type display device according to claim 2, wherein the display element displays an image for which display luminance of image is switched from one to another depending on the type of the eyepiece optical unit identified by the identification unit.

6. The head-mounted type display device according to claim 2, wherein the plurality of types of eyepiece optical units include an eyepiece optical unit for changing aspect ratio of image, and when one of the eyepiece optical units whose type is identified by the identification unit is the eyepiece optical unit for changing aspect ratio of image, an image to be displayed on the display element is compressed or expanded at different ratios in a perpendicular direction and in a lateral direction.

* * * * *